CASH FLOW COMPUTER
Filed May 29, 1967 12 Sheets-Sheet 1
FIG. 1
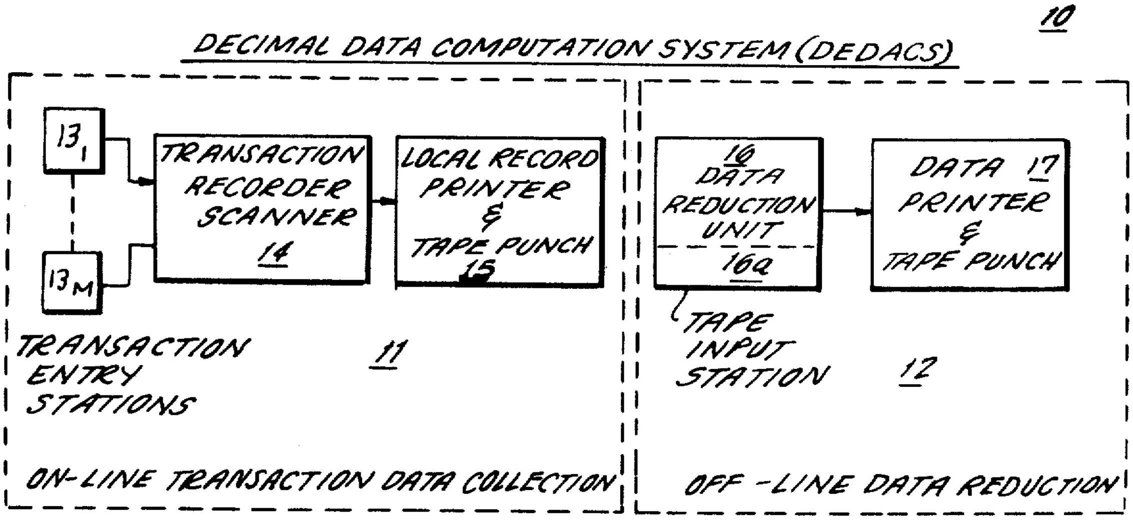
FIG. 4e
| | |
|---|---|
| FIG. 4a | FIG. 4c |
| FIG. 4b | FIG. 4d |
FIG. 4f
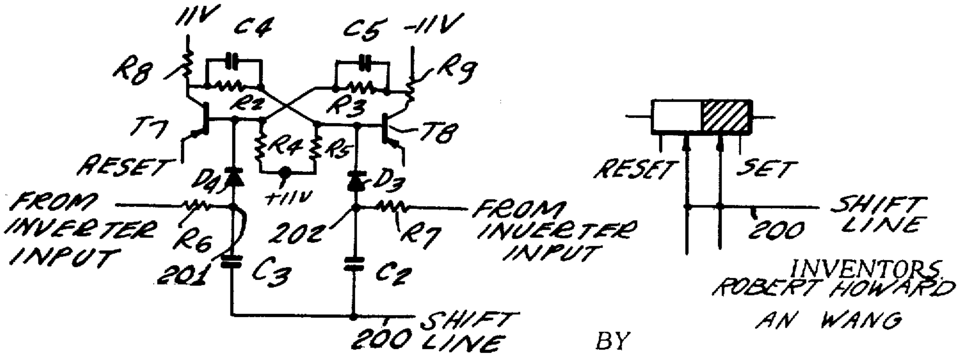
INVENTORS
ROBERT HOWARD
AN WANG
BY
ATTORNEYS June 2, 1970 R. HOWARD ET AL 3,516,068

CASH FLOW COMPUTER

Filed May 29, 1967 12 Sheets-Sheet 2

INVENTORS
ROBERT HOWARD
AN WANG

BY

Ostrolenk, Faber, Gerb & Soffen

ATTORNEYS

CASH FLOW COMPUTER

Filed May 29, 1967

INVENTORS.
ROBERT HOWARD
AN WANG
BY
Ostrolenk, Faber, Gerb & Soffen
ATTORNEYS

INVENTORS.
ROBERT HOWARD
AN WANG
BY Ostrolenk Faber Gerb & Soffen
ATTORNEYS

INVENTORS.
ROBERT HOWARD
AN WANG

ATTORNEYS

June 2, 1970 R. HOWARD ET AL 3,516,068

CASH FLOW COMPUTER

Filed May 29, 1967 12 Sheets-Sheet 6

June 2, 1970 R. HOWARD ET AL 3,516,068

CASH FLOW COMPUTER

Filed May 29, 1967 12 Sheets-Sheet 7

CASH FLOW COMPUTER

Filed May 29, 1967

INVENTORS
ROBERT HOWARD
AN WANG

BY

Ostrolenk, Faber, Gerb & Soffen
ATTORNEYS

INVENTORS
ROBERT HOWARD
AN WANG

Ostrolenk, Faber, Gerb & Soffen
ATTORNEYS

INVENTORS.
ROBERT HOWARD
AN WANK

BY

Ostrolenk, Faber, Gerb & Soffen
ATTORNEYS

United States Patent Office 3,516,068
Patented June 2, 1970

3,516,068
CASH FLOW COMPUTER

Robert Howard, Roslyn, N.Y., and An Wang, Lincoln, Mass., assignors, by direct and mesne assignments, to Centronics Data Computer Corporation, Flushing, N.Y., a corporation of Delaware Filed May 29, 1967, Ser. No. 641,888
Int. Cl. G06 7/06, 9/00
U.S. Cl. 340—172.5 17 Claims

ABSTRACT OF THE DISCLOSURE

This invention teaches a transaction recording and processing system comprising terminals provided at a plurality of remote locations continuously coupled to scanning and processing equipment provided at a central location for display operational purposes and selectively coupled to said central scanning and processing equipment for data transfer purposes, each of said terminals comprising first memory means for storing function information; second memory means for storing decimal information; keyboard means for entering decimal and function information into said first and second memory means; first display means capable of being illuminated for displaying functional information stored in said first storage means; second display means for displaying decimal information stored in said second memory means; said second memory means having a storage capacity for storing a plurality of decimal positions; said display means having a plurality of positions equal in number to the decimal positions of said second memory means and each being coupled to an associated position in said second memory means; said scanning and processing equipment comprising means for generating a plurality of pulses generated during a predetermined cycle time and for continuously repeating said pulses during each cycle time; said pulses being equal in number to the number of positions in said second memory means and said second display means; means coupled to said pulse generating means for coupling each of said pulses simultaneously to associated positions of said second display means and said second memory means to cause the display positions of said second display means to be illuminated in sequential fashion to display the character stored in its associated memory position; the recycling of said pulses causing each display position to be intermittently illuminated at a repetition rate to cause the persistence of the human eye to treat the illuminated display as being constantly illuminated.

Figure 2C:
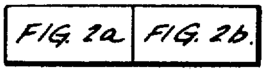

A photographing and conveying means is provided to photograph each bill inserted into a bill receiving opening and convey it to a currency receptacle. The photographing and conveying means is energized when the keyboard is activated and a bill is inserted into the conveying means.

The instant invention relates to data processing systems and more particularly to a system for very strictly and accurately regulating the cash flow into and out of the system for a business establishment to prevent any unauthorized removal of cash from the system as well as providing accurate records of authorized intake, outflow and other data either necessary or useful for the successful operation of the business establishment.

In business operations wherein the great majority of business transactions are cash transactions it is advantageous and in some cases necessary to exert as much control as possible over cash intake at each location capable of carrying out a cash transaction. It is also important to prevent unauthorized use of the cash depository, to know the exact identity of the operator handling the transaction and to prevent access to cash from preceding transactions during the time that a subsequent transaction is being performed.

The instant invention solves all of the above identified problems while at the same time providing an all-electronic substantially high speed system for gathering information regarding each transaction and providing all calculations either necessary or desirable for maintaining accurate records regarding all aspects of cash transactions.

The instant invention is characterized by providing a manually operable input keyboard at each location at which a cash transaction is to occur. The keyboard is provided with a plurality of manually operable buttons for setting in the amount and type of transaction. Each keyboard input is normally deactivated by suitable interlock means which may only be defeated through the insertion of an operator's identifying card which serves the function of defeating the interlock to activate the keyboard input as well as setting up predetermined electrical circuits to identify the operator gaining access to the keyboard input.

The keyboard is provided with a visible display which illuminates the amount and type of transaction inserted into the device through the input keys. If the display is correct a transmit request button is depressed. If the operator has accidentally depressed an incorrect key, observation of the illuminated display will bring this to the attention of the operator, allowing the operator to depress a clear button in order to reinsert the correct information. Each keyboard is provided with a memory for storing the information regarding the transaction until such time as the central processing system recognizes the transmit request and scans the keyboard initiating the transmit request in order to transfer the information to the central processing system.

The central processing system is provided with a transaction recorder-scanner which contains all electronic equipment necessary to scan each operator's input station, translate the data from each station and print out the transferred information simultaneously in a local record printer and a tape punch means.

The local record printer and tape punch unit produces a page copy of any desirable width, printing all data received from the operator's entry stations while at the same time preparing a paper tape containing the same data.

The punch paper tape may be removed at any time and placed in the tape input means of a transaction data reduction unit which contains all electronic equipment necessary to read punched paper tape produced by the local record printer and tape punch. The data is converted by suitable electronic computational means and when the computations are completed the data reduction unit operates a data report printer and tape punch which is substantially identical to the local record printer and tape punch.

The data processing center keeps all transactions up-to-date performing all necessary calculations and providing a print-out which produces an up-to-date record of all transactions. In one preferred embodiment up to 32 keyboards may be connected to a single data handling unit. Up to 2400 transactions may be handled in any 24-hour period and every keyboard may simultaneously request recording of data from the control data handling unit.

An opening is provided adjacent each keyboard unit for the receipt of cash taken in as a result of the business transaction. Positioned immediately beneath the opening is a conveyor means provided with means for grasping the bills inserted into the opening and rapidly driving the bills into a cash box which is provided with a lock which may be opened only by authorized personnel.

Camera means is provided within the conveyor apparatus for photographing each bill as it is deposited into the opening. The conveyor means and camera means are normally deenergized and become activated by means of a circuit provided within the keyboard which closes when data is inserted into the keyboard by means of the manually operable keys.

The transaction recorder-scanner continuously scans each of the keyboard input stations. Upon receipt of a transmit request signal the transaction recorder-scanner interrupts its scanning action and picks up the station message which is comprised of the data digits representing the display data, digits indicating the operator's plate identification code and additional digits indicating the function key depressed and other necessary data formatting digits.

Once the message is successfully transferred the display remains on the keyboard but the bid signal to the scanner is removed causing a light indicating the request to be turned off and unlocking the keyboard. The scanner then continues its scanning cycle seeking the next station to request service.

The data message passes directly through the scanner and is printed out as a single line item on the local record printer and is punched out on a paper tape which is wound up upon a suitable storage reel.

Data reduction may be performed on an off-line basis wherein the reel of the punch paper tape is taken from the local record printer and manually loaded into the data reduction unit tape reading station. Depression of a start key causes the first transaction to be fed through the tape reading means and into a temporary memory. While in the temporary memory the operator's identification code, the transaction entry code and particular function key code are scanned and decoded. As a result of the data scan the data reduction unit selects a specific data storage location. This specific storage location is read out into an accumulator memory and the data in temporary memory is added to the data in the accumulator memory to form the updated transaction quantity data. The new total in the accumulator memory is then written back into the specific storage location originally selected by the operator's identification code, by the transaction entry code and by the particular function code. The paper tape automatically advances to the next punch transaction and the above steps are repeated. The load-in mode continues until the process is manually stopped by depression of a stop key or until the end of the tape is reached.

Each data storage location corresponding to a specific operator's identification code and the transaction entry code and particular function key is processed and fed to the data printer and tape punch. The data printer and tape punch then print out all information necessary for operation of the business such as dollar in-flow and out-flow, material in-flow and out-flow and the ratio of total material over total dollars as well as a grand total of all of the above.

In the case where an on-line data reduction system is employed an alternative embodiment for the processing system is comprised of a four bank memory unit capable of scanning the four keyboard input simultaneously. As data is stored it is transferred through an output means into a computer system which feeds the data into a data printer which prints all data transferred thereto. The computer system also carries out all computations and transfers this data to the data printer means which prints out the received data in both printed and punched tape form. The data in raw form (i.e., before processing) which is transferred to the data printer means is simultaneously stored in magnetic storage means such as, for example, magnetic tape data storage means as it is being printed out. The computer system utilizes the identifying portion of the data to address the storage means during the processing operation. In substantially the same manner as was previously described, all data is updated and completed computations are transferred to the teletype data printer means for both print-out and return to the data storage medium in readiness for the next up-dating operation for the data stored at that particular location. Thus, both raw data and data which has undergone computation is transferred to the printer means for both storage and print-out enabling substantially immediate observation of data in the system.

In the case where a new operator is assigned to a keyboard input station, the operator's card may be inserted into the card slot "upside down" in order to activate predetermined circuits which indicate that inventory information together with the operator's number is to be transmitted. The operator may then take inventory of the goods on hand and depress the appropriate keys upon the manually operable keyboard to transmit inventory information to the data processing center.

It is therefore one object of the instant invention to provide a novel electronic system for transmitting data from a plurality of keyboard input stations to a central processing system for recording of all data inserted into the keyboards and for performing computations in order to update the stored data at any given time.

Another object of the instant invention is to provide a novel system for transferring data related to business transactions to a central processing system wherein each keyboard station is provided with a slot for an operator's identifying card which activates the normally deenergized keyboard station and sets up circuitry to indicate the operator's identifying number and further comprising manually operable input buttons for setting up the data and accompanying function information in an illuminated display to enable the operator to ascertain the correctness of the data before depressing the function key which further functions as a transmit request signal.

Still another object of the instant invention is to provide a novel data processing system for storing and computing data related to business transactions and comprising a plurality of keyboard input stations coupled to a central processing system wherein each keyboard input station is provided with manually operable input keys for inserting data into the keyboard; an illuminated display enabling the operator to determine the correctness of data inserted; a slot for receiving an operator's card which sets up circuitry for indicating the operator's identifying code and for activating the normally deenergized keyboard; a combination conveyor and photographing means activated upon depression of a function key for conveying bills or other forms of legal tender inserted through a slot adjacent the keyboard into a container for holding the legal tender and for simultaneously photographing each bill as it passes through the conveyor means.

Still another object of the instant invention is to provide a novel data processing system for storing and computing data related to business transactions and comprising a plurality of keyboard input stations coupled to a central processing system wherein each keyboard input station is provided with manually operable input keys for inserting data into the keyboard; an illuminated display enabling the operator to determine the correctness of data inserted; a slot for receiving an operator's card which sets up circuitry for indicating the operator's identifying code and for activating the normally deenergized keyboard; a combination conveyor and photographing means activated upon depression of a function key for conveying bills or other forms of legal tender inserted through a slot adjacent the keyboard into a container for holding the legal tender and for simultaneously photographing each bill as it passes through the conveyor means and further comprising memory means provided in each keyboard station for indefinitely storing data until the central processing system accepts and transfers the data into the system memory.

Still another object of the instant invention is to provide a novel data processing system for storing and computing data related to business transactions and comprising a plurality of keyboard input stations coupled to a central processing system wherein each keyboard input station is provided with manually operable input keys for inserting data into the keyboard; an illuminated display enabling the operator to determine the correctness of data inserted; a slot for receiving an operator's card which sets up circuitry for indicating the operator's identifying code and for activating the normally deenergized keyboard; a combination conveyor and photographing means activated upon depression of a function key for conveying bills or other forms of legal tender inserted through a slot adjacent the keyboard into a container for holding the legal tender and for simultaneously photographing each bill as it passes through the conveyor means and further comprising memory means provided in each keyboard station for indefinitely storing data until the central processing system accepts and transfers the data into the system memory and still further comprising a central processing system for providing both storage and print-out of raw (i.e., unprocessed) data and for performing computations on raw data for both storage and print-out of the computed results in order to keep all transactions in the system up to date.

These, as well as other objects, will become apparent when reading the accompanying description and drawings in which:

FIG. 1 shows a block diagram of the decimal data computation system of the instant invention.

Figure 2A:
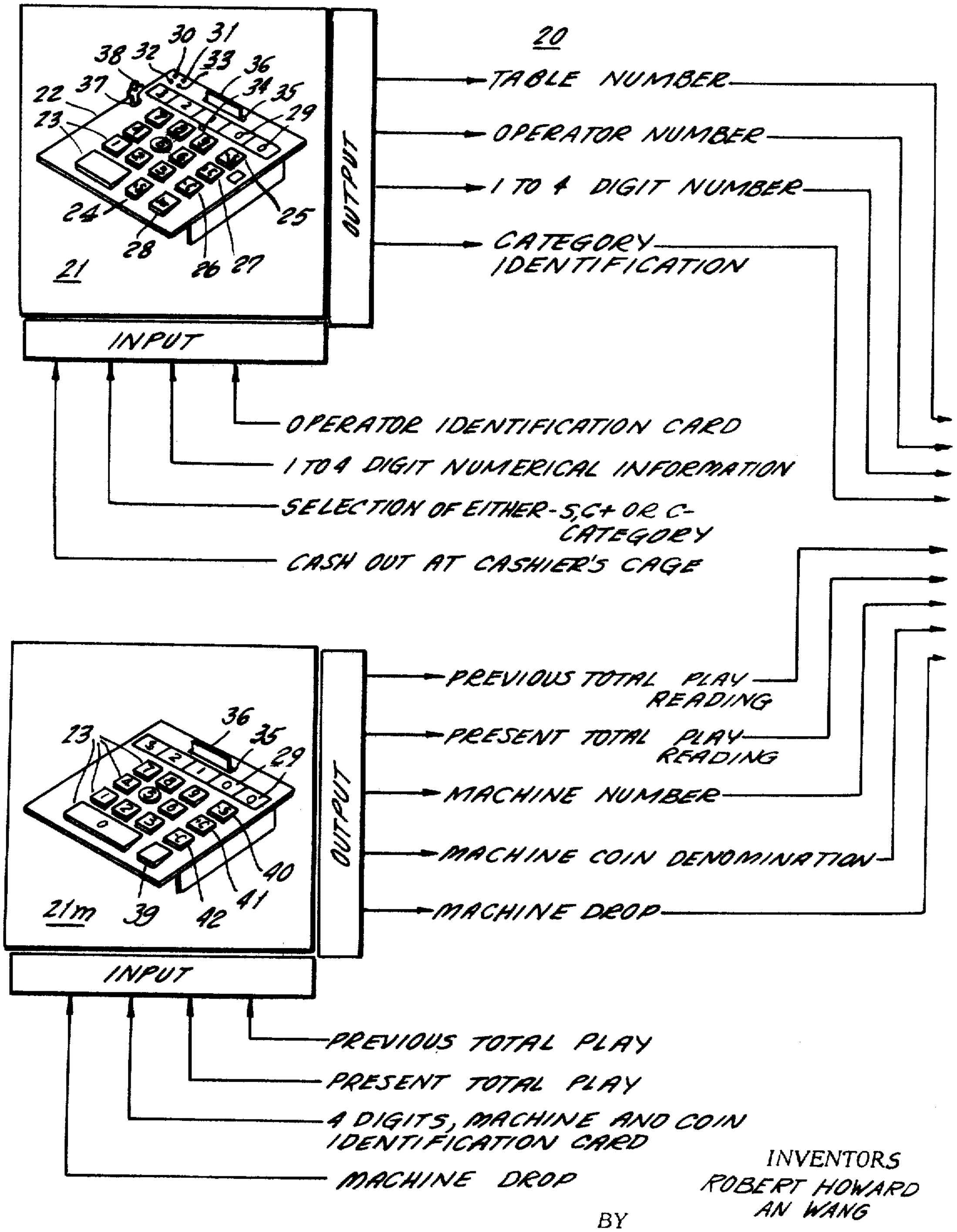
Figure 2B:
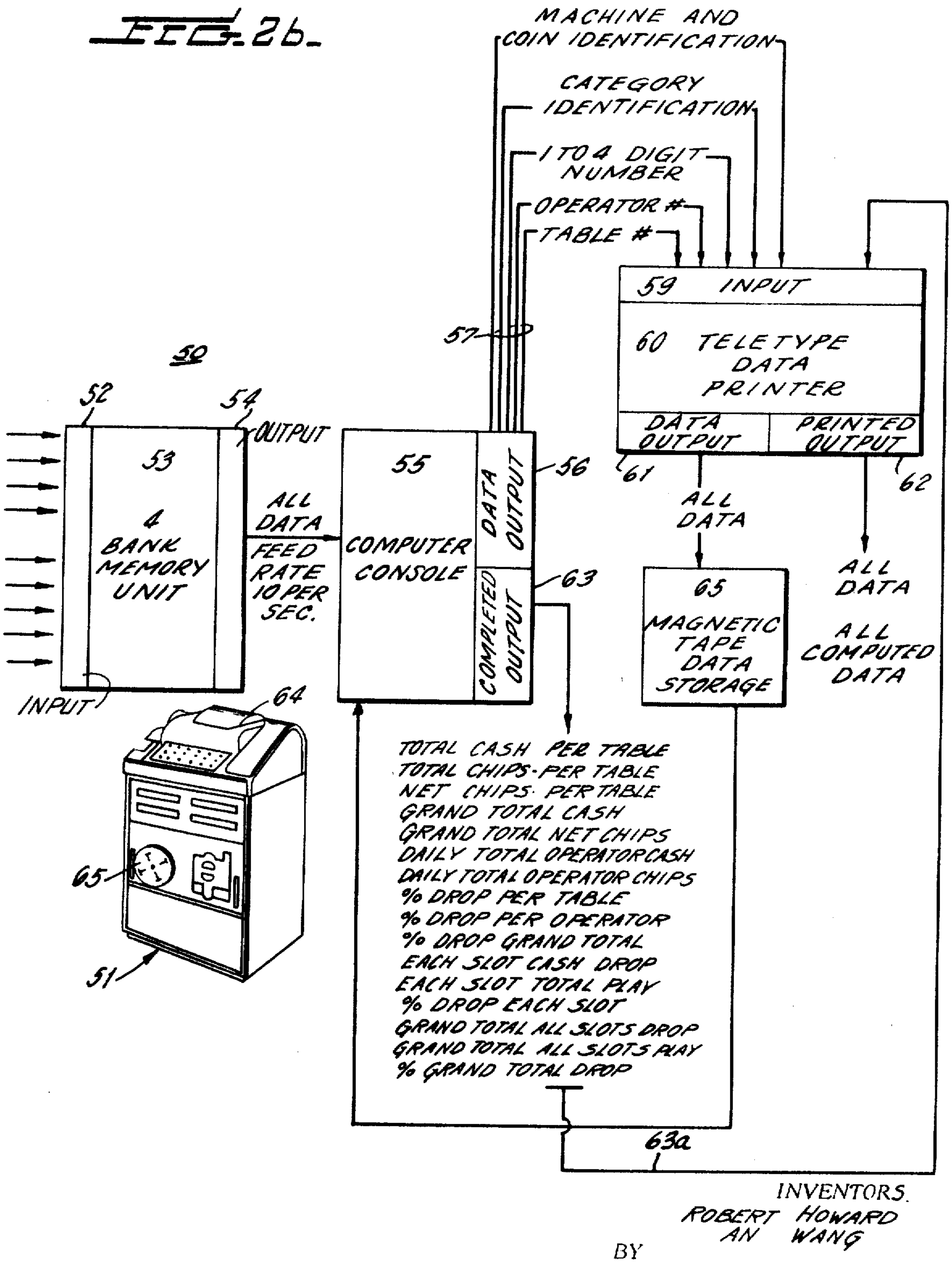

FIGS. 2*a* and 2*b* form a block diagram showing an alternative embodiment for the decimal data system of the instant invention.

FIG. 2*c* shows the manner in which FIGS. 2*a* and 2*b* should be arranged.

Figure 3A:
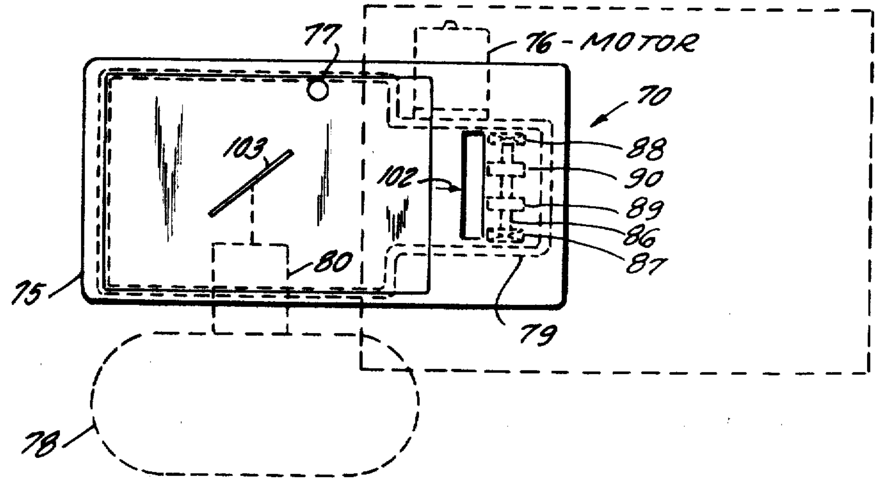
Figure 3B:
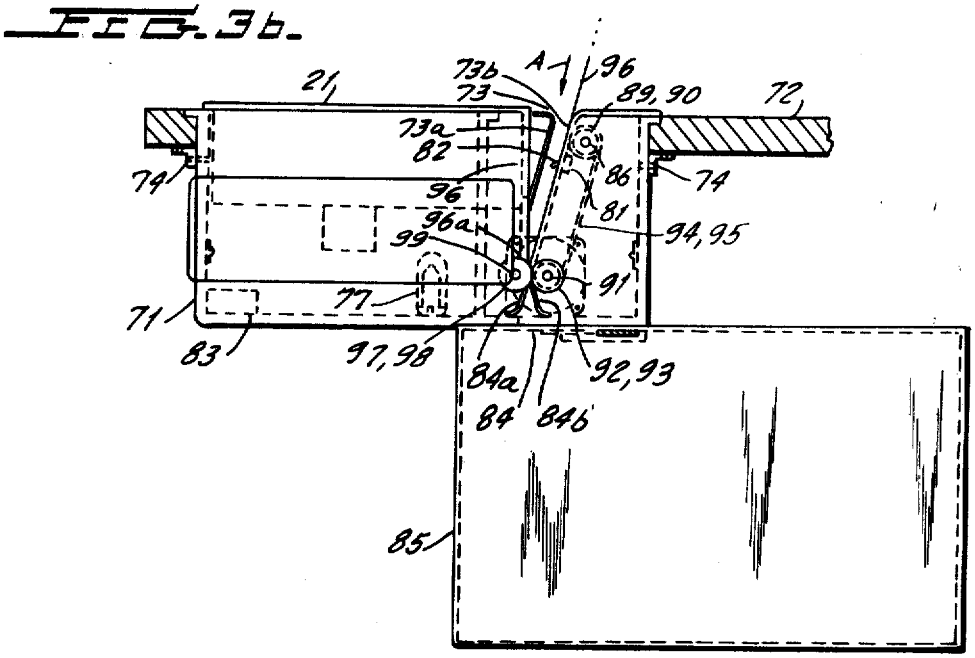

FIGS. 3*a* and 3*b* are top and elevational views respectively, showing the pertinent constituents of a keyboard input station of the type shown in FIG. 2.

Figure 3C:
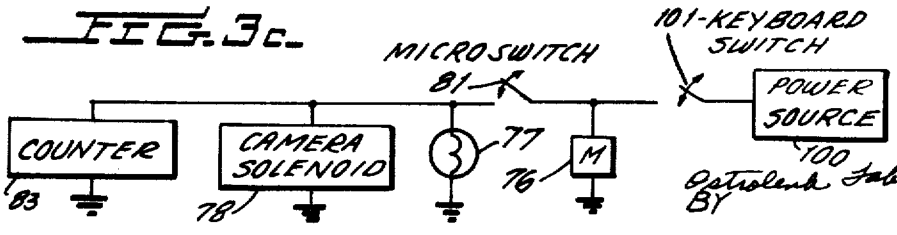

FIG. 3*c* shows a block diagram of the electronics which may be employed with the device of FIGS. 3*a* and 3*b*.

FIGS. 4*a*–4*d* form a schematic diagram showing the electronics of a typical keyboard input station.

Figure 4A:
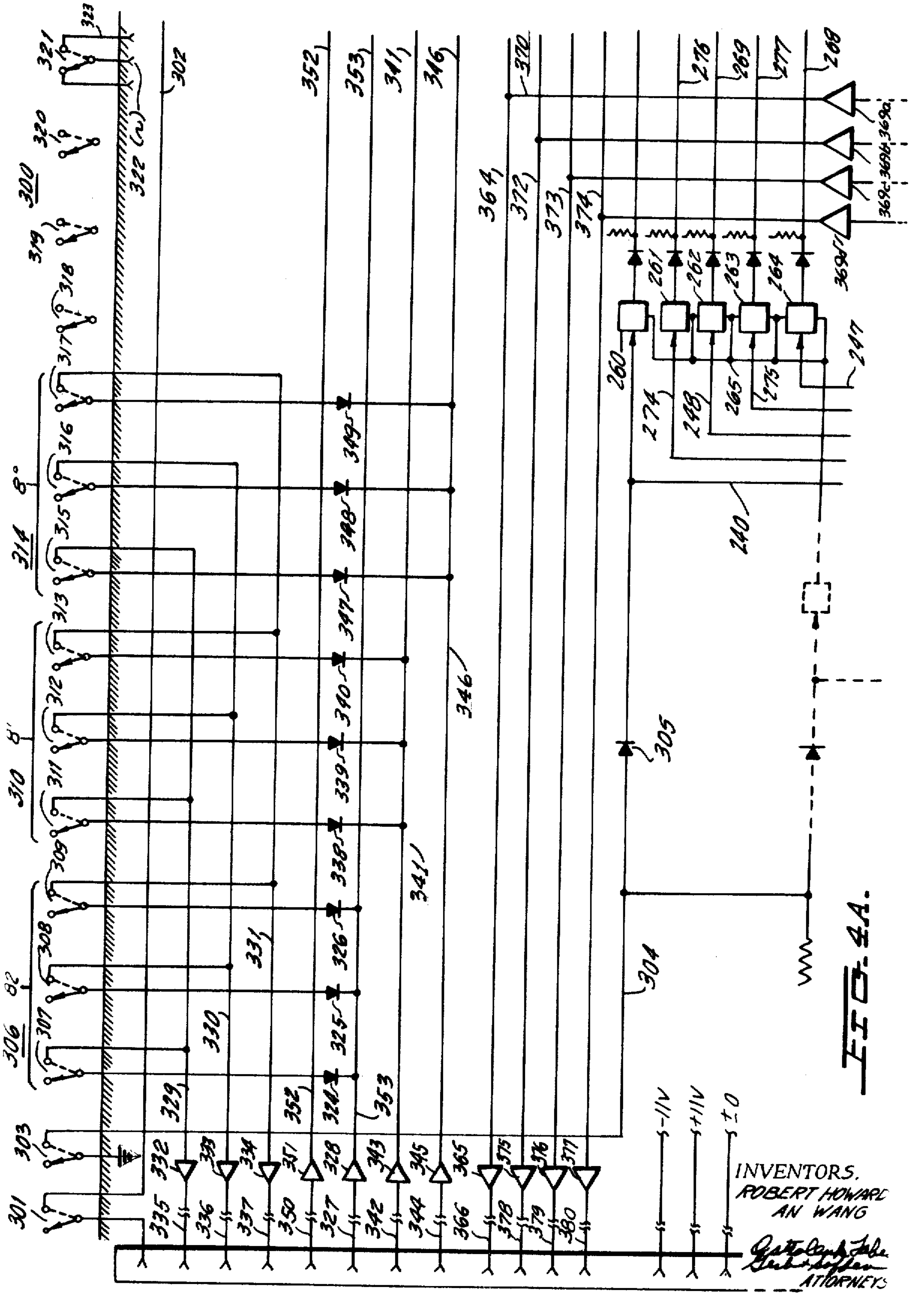
Figure 4B:
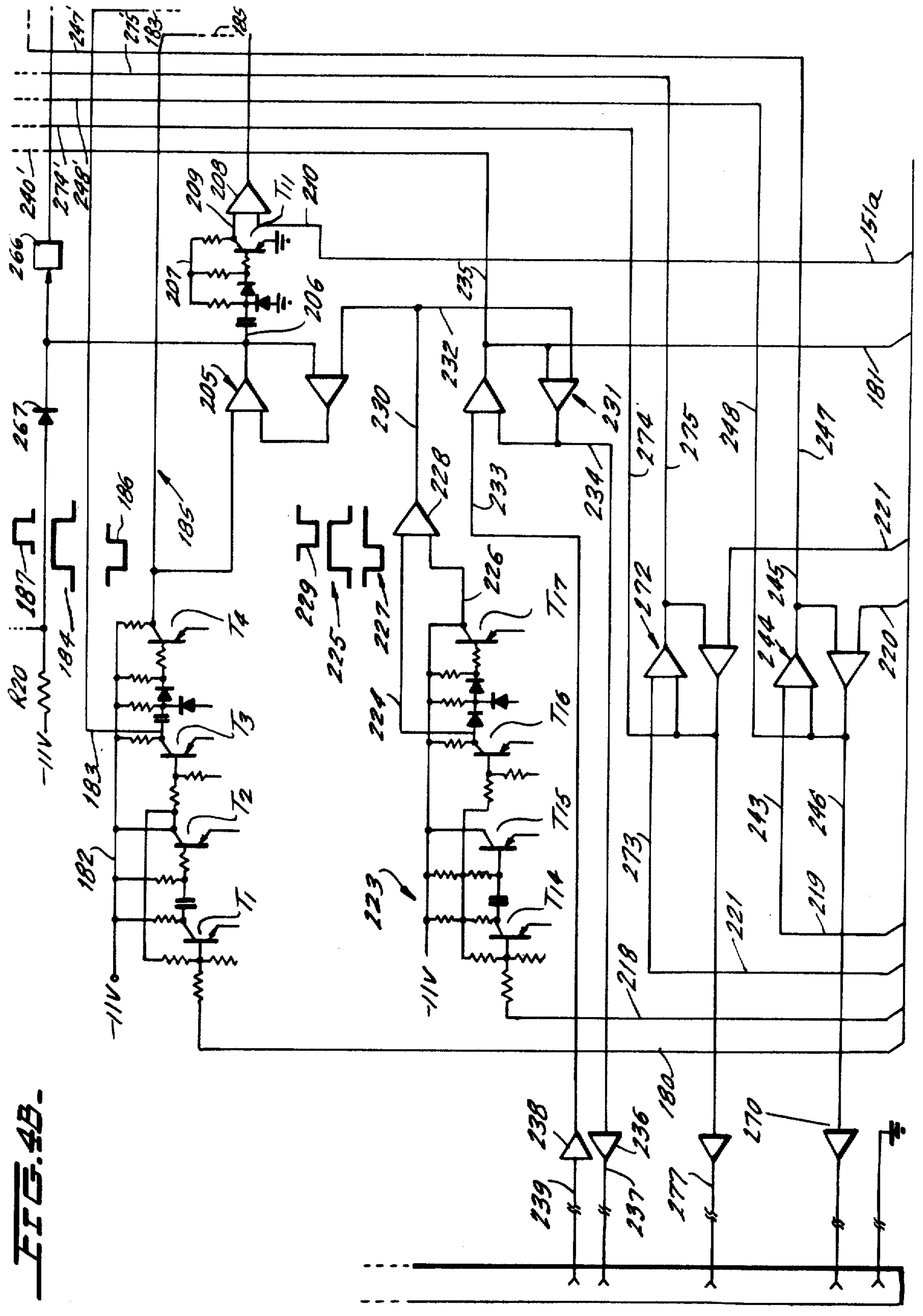
Figure 4C:
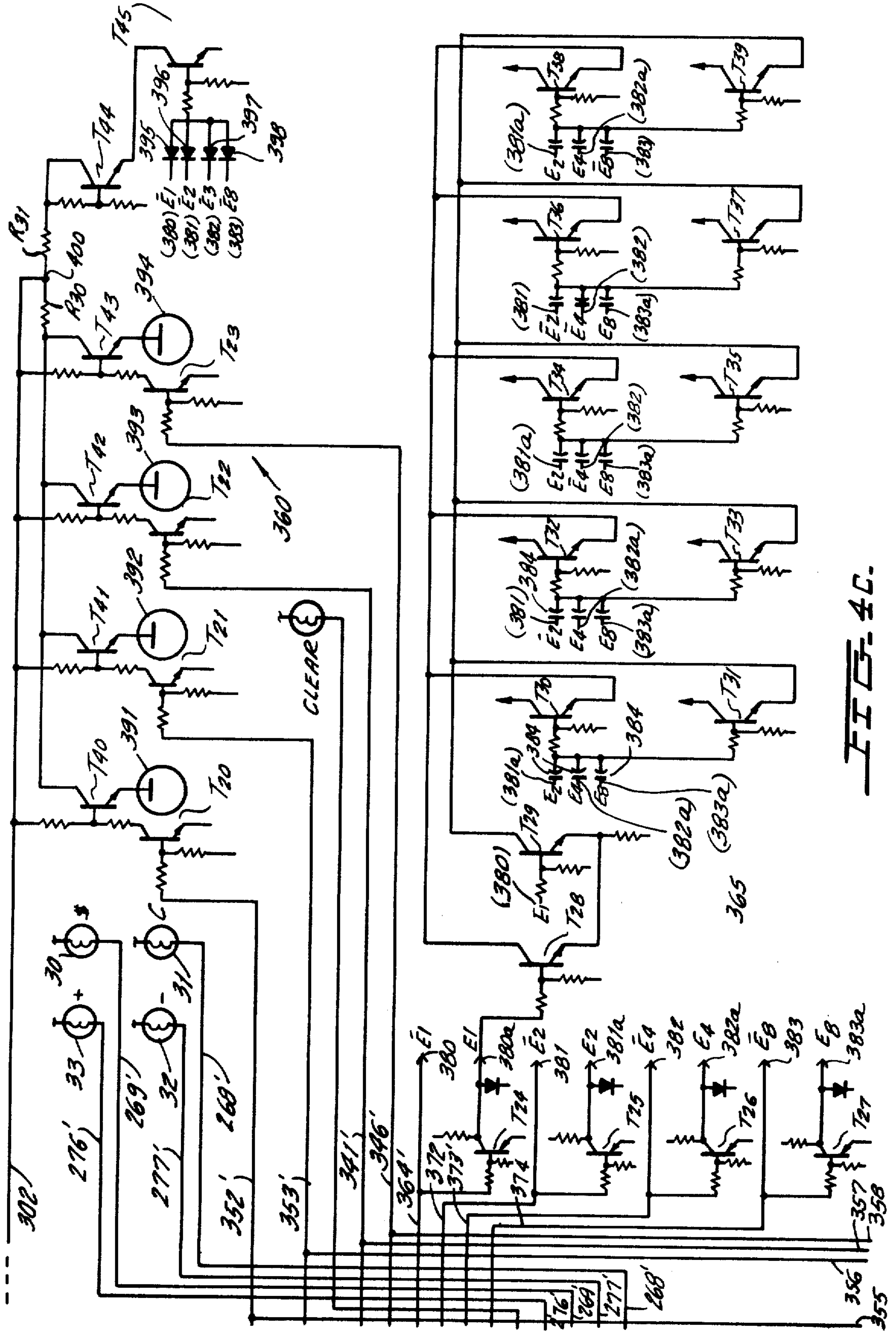

FIG. 4*e* shows the manner in which FIGS. 4*a*–4*d* should be arranged.

FIG. 4*f* is a schematic and block diagram of a flip-flop of the type employed in FIGS. 4*a*–4*d*.

FIGS. 5–8 partial in block diagram form and partial in schematic form showing the scanner-counter means of the central data processing means of FIGS. 1 and 2 in greater detail.

Referring now to the drawings, FIG. 1 shows a simple block diagram of a system embodying the principles of the instant invention. The system 10 shown therein is comprised of an on-line transaction data collection substation 11 and an off-line data reduction subsystem 12. The data collection system is comprised of a plurality of keyboard input stations $13_1$–$13_m$, only two such keyboard input stations being shown in FIG. 1 for purposes of clarity, it being understood that a greater or lesser number may be employed depending upon the needs of the particular user. Each of the keyboard input stations 13 will be described in greater detail. For purposes of understanding the basic concepts of the system, each keyboard input station is normally locked against usage pending the insertion of an operator's identifying card into a suitable slot provided therefor to activate a particular keyboard input station and further to activate associated circuitry conditioned as a result of insertion of the card for the purpose of transferring the operator's identifying code together with other data inserted through operation of the keyboard, to the system processing means. The keyboard is provided with manual input means for the purpose of inserting coded data representative of the amount and type of the transaction to be recorded. The type of transaction is indicated by depression of the appropriate function key which causes generation of a signal identified as a request for the processing system to transfer data from the activated keyboard to the processing system. All of the keyboard input stations may be simultaneously operated in a similar manner, each by an associated operator through the insertion of his operator's identifying card.

Each of the keyboard input stations $13_1$–$13_m$ are coupled to a transaction recorder-scanner 14 which contains all of the electronic equipment necessary to scan the operator's entry stations, translate the data from these stations and drive a local record printer and tape punch means 15.

The local record printer and tape punch means 15 produces a page copy preferably of 8½" width upon which all data received from the operator's entry stations is printed, while at the same time punching all of the same data in coded fashion on a paper tape which may, for example, be a standard 8-column paper tape means, however, any other paper tape and code may be employed depending only upon the needs of the user.

The transfer request signal generated by depression of a function key at any one of the keyboard input stations causes the transaction recorder scanner 14 which scans through the keyboard stations, to stop the scan when it reaches the scanning position representing that station generating a transfer request signal. The scanning operation is terminated at the time that the activated station is reached, at which time data at the activated station is transferred to the record scanner 14.

When the transaction is being recorded and the function key is depressed at a keyboard input station, the keyboard is locked and thereby prevented from being utilized for a subsequent input operation until the scanning operation is completed. The completion of the scanning operation unlocks the keyboard enabling the performance of a subsequent input operation and the recorder-scanner resumes its scanning operation seeking the next station requesting data transfer.

For those system applications in which immediate data reduction is not required, the off-line data reduction means 12 of FIG. 1 may be employed. The reel or punched paper tape produced by the local record printer and tape punch 15 is periodically removed and manually loaded on to the data reduction unit tape reader station **16*a* provided in the data reduction unit 16. Upon loading, operation is begun by depression of a suitable start key (not shown) causing the data stored in the tape unit to be read and transferred into a temporary memory, to be described subsequently in greater detail. The identifying code portions of the data transferred into temporary memory are employed to select a specific permanent data storage location which contains data of a previous transaction having the identical identifying code information. Data stored therein is called out and the data read at the tape input station 16*a* is combined with the data transferred out of permanent memory in accordance with the mathematical operation called for and the result of the mathematical operation is transferred back into the location in permanent memory from which the last transaction was transferred. The paper tape automatically advances to the next punch transaction and the above steps are continuously repeated. As each storage location is processed, the reduced data is fed to the data printer and tape punch 17** and simultaneously prepares a tape punch and printed page listing the transactions performed for a particular period such as an hour, day, month, year. The tape punch record may be stored for still further data reduction. FIGS. 2*a* and 2*b*, when positioned together in the manner shown in FIG. 2*c*, form a slightly modified system 20 relative to the system 10, shown in FIG. 1. The system 20 is comprised of a plurality of keyboard input stations 21 through **21*m*, only two of which are shown for purposes of simplicity. Since each of the keyboard input stations are substantially identical to one another, like elements will be designated by like numerals. Considering first keyboard 21, the assembly is comprised of a panel 22 which may be mounted flush at a table which has a plurality of input keys 23 for inserting decimal data representative of the numbers 0 through 9. Additional manual input keys are provided for performing functional operations and are identified as a plus dollars (+$) key 24, minus dollars (−$) key 25**, a minus chips (−*c*) key 26, a plus (+*c*) chips key 27 and a clear key 28.

The keyboard has a visual display comprised of a plurality of Nixie tubes which are well-known in the electronics field for the purpose of visually displaying decimal numbers 0 through 9. Four said Nixie tubes 29 are provided for the purpose of displaying any decimal number from 0 0 0 0 to 9 9 9 9. Additional display elements are comprised of display lights 30 through 33 for indicating dollars, chips, plus and minus, respectively, and a fifth display light 34 which indicates recording, the functions of which will be subsequently described.

The top end of the keyboard is provided with an elongated slot 35 for receiving an operator's card 36 in order to activate the keyboard.

Before describing the manner of operation of the keyboard, one specific application of the cash flow system will now be given:

In operations such as gambling casinos, it is desirable, and often necessary, to provide as much control and supervision over the handling of cash transactions as is physically and mechanically possible. In addition to the possibility of cheating a cash flow system, it further is both desirable and necessary to minimize unintentional human error by transferring as much of the functions relating to a cash transaction over to either mechanical, electromechanical or electronic equipment as is practical.

Present cash flow systems in gambling establishments are all strictly manual. When a party wishes to participate in a particular game of chance, he may approach a particular table such as the game of Twenty-one, Roulette, or Craps, or any other game of chance found in a gambling establishment, and purchase chips at the table for cash. The transaction is handled exclusively in a manual fashion wherein the croupier, or other operator, accepts the cash, deposits it in a slot provided usually in the surface of the gambling table, stuffs the money into the slot through the use of an elongated board which fits into the slot, and provides the purchaser of chips with an amount of chips equal to the amount of cash received by the operator. Whereas a plurality of individuals, usually under the employ of the gambling establishment, are hired for the purpose of circulating through the establishment or observing from specific vantage points to assure the fact that the croupiers, dealers or other attendants are honestly performing their duties, such surveillance cannot be 100% effective, and in addition to such surveillance, there is no means whatsoever, under the present procedures, for providing any immediate recording of transactions in which chips are either purchased or cashed in.

The arrangement of the instant invention provides a number of the above objectives, while, at the same time, performing these functions simply and rapidly so as not to interfere with the normal duties of a gaming table attendant.

The manner in which the keyboard input station is operated is as follows:

The attendant responsible for a particular gaming table is provided with a particular card 36, which is generally of the dimensions of a conventional credit card and which is edge-coded along its top and bottom edges in the manner to be more fully described, preferably to provide an octal code. The card 36 is inserted into an elongated slot 35 provided in the keyboard panel, and snaps into position to let the operator know that the card is properly positioned. When an operator first is assigned to a table, the card is inserted into the elongated slot "upside-down," the edge-coding providing on the top edge of the card which now sets the plurality of switches in a predetermined fashion (which switches will be described subsequently) setting up a code to indicate that the operator wishes to transmit data to a local processing center (to be more fully described) for the purpose of providing an inventory of chips on hand. In one application, the normal amount of chips which a table begins with is a total of $3,000.00, be the chips $1.00, $5.00, $10.00 chips and so forth. If, upon taking inventory of the chips on hand, the amount is exactly $3,000.00, the operator depresses the ZERO pushbutton 23 four times to read into the visual display Nixie tubes 29 the number 0 0 0 0. The lighting of the display permits the operator to view the display in order to determine whether he has entered the number in correctly. Once the operator is satisfied that the number has been entered correctly, he then depresses the plus chips input button 27 to indicate that the inventory is exactly $3,000.00. If the chips amount to greater than $3,000.00, the difference between the amount and $3,000.00 is entered into the keyboard and, once the operator is satisfied that the number has been entered correctly, the function key plus chips 27 is depressed, providing an indication that the inventory is greater than $3,000.00.

If, upon taking inventory, the operator finds that the amount of chips is equal to less than $3,000.00, the difference between the amount of chips and $3,000.00 is entered into the keyboard unit by depressing the appropriate decimal keys 23 and viewing the visual display. If the visual display indicates the correct decimal number, the operator then depresses the minus chips pushbutton 26, which may only be operated after the insertion of a key 38 into a lock 37 in order to permit depression of the minus chips key 26. The key 38 is not carried by an operator, but is only carried by a floor man ("pit boss") who will insert the key upon the operator's request and upon being satisfied as to the reason necessary for the insertion of the key to unlock 37. Other functions of the lock will become apparent upon subsequent descriptions herein.

During any of the above mentioned operations, once the function keys are depressed, the lamp 34 will be illuminated to indicate the fact that a recording is to take place. During this time the keyboard is electronically locked, and cannot be used for any subsequent transactions until the recording lamp 34 is turned off. The means which turns off the recording lamp is the scanner-recorder means to be more fully described, which scans each keyboard, determines which one has initiated a record-request, stops at that keyboard having a record-request, and transfers the data impressed therein to the recording device. Upon completion of the transfer operation, the keyboard is unlocked, and the recording lamp 34 is turned off to permit the next transaction to begin. The scanning operation, even in the case where a number of keyboards are employed, is normally performed within several seconds. This is true, even in the case where as many as thirty keyboards are employed in a single system.

An alternative method of taking inventory of chips is as follows:

The operator about to go off duty takes inventory of the chips at his table. The total amount is then recorded by depressing the plus chips push-button, together with the amount which is then recorded by the scanner-recorder. This operator then removes his operator's card from the slot and the next operator to go on duty inserts his operator's card in the slot and records the same identical transaction as minus chips to indicate the inventory of chips as the new operator begins functioning at that table. The plus chips transaction is employed at subsequent times to indicate that chips have been brought to the table by the "pit boss" or any other employee. In a like manner, the minus chips function is performed whenever chips are taken away from the table and brought to another location by the "pit boss" or any other employee.

Upon completion of the inventory operation, the gaming table operator is now free to conduct additional transactions. Let it be assumed that the party wishing to participate in the particular game first desires to purchase chips from the gaming table operator. He hands the money to the operator and requests an amount of chips equal to the amount of dollars given to the operator.

Before the operator handles such a transaction, he removes his edge-coded card 36 from elongated slot 35 and replaces it in the "right-side-up" position which sets up another code combination indicating the operator's identifying number, and setting up circuitry indicating that chip-purchasing transactions will now occur, and further deactivating circuits which indicate that an inventory transaction is being performed.

Upon receipt of the cash from a person desirous of purchasing chips, the operator inserts the cash into an opening (not shown in FIGS. 2*a* and 2*b*) which receives the money, photographs each bill and passes the bills from the photographing station into a currency receptacle such as, for example, a receptacle of the type described in U.S. Pat. No. 3,292,849. The receptacle is usually connected to the underside of the table top and has a currency-receiving slot communicating with a similar slot in the table. When the dealer receives currency from one of his customers, he simply stuffs it through the opening into the receptacle. At the end of an operating period, or when the receptacle is full, the dealer may remove the receptacle from the table and transport it to a cashier for opening, emptying and counting of the currency. The receptacle may then be relocked and replaced in service. It should be understood that the photographing station (to be more fully described), together with a conveying means, is positioned between the table top opening and the currency receptacle to permit the photographing operation before bills enter the receptacle. The photographing and conveying means are normally deactivated, as will become evident upon subsequent description herein, and are activated only upon the entry of an operator's card into the keyboard elongated slot 35.

Once the amount of the purchase is determined, the operator depresses selected ones of the input keys 23 to indicate the amount of the purchase. Whereas any other arrangement may be provided, in one prefered embodiment, the most significant digit is entered first. Let it be assumed that the customer desires to purchase $75.00 worth of chips. The operator will then depress the key 7, which will enter the decimal number 7 into the right-handmost Nixie tube position. The operator will then depress the 5 key, which will cause the display of the decimal number 7 to move one position to the left and cause the display of the decimal number 5 to occur in the right-handmost position of the display. The operator will then observe the display in order to ascertain the fact that the correct number has been entered into the keyboard. Once the operator is satisfied with the correctness of the illuminated display, he then depresses the plus dollars key 24 to indicate the intake of $75.00 in currency. The operation of the function keys causes the recording lamps 30 and 33 to light, and further causes the recording lamp 34 to light. Again the operator can ascertain whether he has depressed the appropriate keys by observing the display lamps 30 through 33.

As was previously mentioned, the depression of the function keys causes the energization of a record bid transmitted to the scanner-recorder system, which functions in a manner to be more fully described in detail, so as to scan each of the keyboard input stations, ascertain which of those are bidding for the transfer of data, stopping at the keyboard input station which has generated a bid signal, transferring the data from that keyboard input station to the recorder-scanner, and deenergizing its record light, as well as activating a circuit enabling it to begin another transaction, and then continuing its scan cycle throughout the keyboard stations to search out the next keyboard station generating a bid signal.

The data transferred to the scanner-recorder system is comprised of coded signals indicative of the operator's identification number, the keyboard input station number, which may be permanently wired into either the station or the scanner-recorder, data indicating the amount of a transaction, and data indicating the type of the transaction which has occurred.

In gambling establishments having slot machines in addition to other games of chance, the keyboard input station **21*m* may be employed. This keyboard 21*m* varies somewhat from the normal type of keyboard employed in that it is provided with a drop key 40, present total play key 41, and a previous total play key 42. The remainder of the arrangement of keyboard input station 21*m* is substantially identical to the keyboard 21** already described.

In a manner similar to that previously described, an operator identifying card 36 is inserted into the elongated slot 35 provided in the keyboard panel.

The operator assigned to transmit slot machine data has the duty of opening each slot machine to observe counters provided therein. A first counter indicates the number of times that the slot machine arm has been operated. Each time the first counter is read, its reading is either recorded upon a card provided inside the slot machine or is recorded upon a dummy counter provided in the slot machine. This indicates to the operator the previous total play while the first counter indicates the present total play in order to determine the number of plays since the last reading was taken. The actual computation will be performed by the computer. When the operator reads the present total play he either changes the reading on the card or in the dummy counter provided in the slot machine so that the present total play now becomes recorded as the previous total play.

Each slot machine is provided with a reservoir for collecting coins which are expelled from the machine when a winning combination is made by the person using the machine. When this reservoir is full, any and all surplus coins are diverted to a coin box. A second counter provided in the slot machine indicates the number of "drops," i.e., the number of coins diverted from the filled reservoir to the coin box.

The operator, after insertion of the operator's card depresses the decimal keys 23 indicative of the previous total play. The operator then observes the visual display tubes 29 to determine whether the correct number has been inserted into the keyboard, and then depresses the previous total play key 41.

When this data has been recorded by the scanner-recorder, the present total play is inserted in a like manner. When the scanner-recorder has recorded the data relating to the present total play, the operator again operates the keyboard to transmit the machine "drop." This completes the operation of the slot machine remote keyboard unit.

If the operator of any of the keyboard input stations depresses the wrong key, an examination of the display will indicate this. Before the depression of a function key, the operator may then depress the CLEAR push-button 39 to clear the display and reinsert the correct number. Thus, any incorrectly inserted number will not be transmitted to the scanner-recorder unit, since the function key is the device which controls generation of a bid signal which requests the scanner-recorder to transfer data at the keyboard input station to the recorder-scanner.

Each keyboard input station whose electronics will be subsequently described, includes memory means physically mounted immediately beneath the keyboard for storing the data to be transmitted indefinitely, or at least until the scanner-recorder unit honors the bid signal and transfers the data stored at each station through the scanner-recorder.

The central processing system 50, which may have the outward physical appearance as shown at 51, is comprised of scanning means 52 having input terminals coupled to the output terminals of all the keyboard stations, and is provided with means for continuously scanning the keyboard stations until a keyboard station generating a bid signal is reached. When a bid signal is recognized, the scanner 52 transfers the data of that keyboard input station into a four-bank memory unit 53, generates and then a signal to indicate completion of the scan, thereby causing that keyboard input station from which data has been transferred to be released from the recording state in order to permit the entry of a subsequent transaction. The indication of the completion of the transfer occurs as a result of the recording lamp being deenergized.

The four-bank memory unit 53 transfers data stored therein to its output section 54 which, in turn, transfers all data at a feed rate of ten stations per second, i.e., the system has the capability of transferring data to the computer transferred from as many as ten keyboard input stations within a period of one second.

Data received from the recorder-scanner is transferred to a computer console which immediately impresses the coded data into its data output section 56 having a plurality of output terminals 57 which couple the transferred data identifying the table number, operator number, transaction amount and type of transaction (i.e., category identification) to the input section 59 of a teletype data printer means 60 having a data output section 61 and a printed output section 62.

In the cse where a slot machine remote unit employing a keyboard input station **21*m* is employed, identifying data in the form of a machine and coin identification is transferred to the input section 59 of the teletype data printer 60**.

In order to first understand the general operation of the machine, let it be understood that data has been received from a keyboard input station of the type 21 shown in FIG. 2*a*. Then coded data representative of the table number, operator number, transaction amount and type of transaction (i.e., category identification) is impressed upon the input section 59 of the teletype data printer 60. This information is simultaneously transferred to the teletype data printer, data output section 61, and printed output section 62. The printed output section 62 prints out all of the transactions, one transaction per line, upon a paper web 63, as shown at the inset 51.

The identifying information transmitted to the data output section 61 is impressed upon the input of a magnetic tape data storage means 65, the magnetic tape section also being shown at the inset 51. The identifying information such as table number and operator number is employed for the purpose of locating a storage location in the magnetic tape data storage means 65, in order to read out any transaction previously recorded at this location. While in the preferred embodiment described herein, magnetic tape storage means is employed, it should be understood that any other type of storage means may be employed such as, for example, magnetic cores (arranged in a matrix), magnetic drums, magnetic disks, or other relatively high-speed storage means. If a lower speed storage means is desired, certainly a paper tape memory, mechanical delay memory, or any other similar type memory may be employed.

Once the storage location assigned to the table number and operator number of the data presented to the input of the magnetic data storage means 65 is located, the data stored in this address is transmitted from the output lead of magnetic tape data storage means 65 to the input of the computer 55 which is provided with an arithmetic section enabling the past total transaction added to or subtracted therefrom or any other mathematical manipulation performed, together with the most recent transaction received.

Once the mathematical operation is performed, the result of this operation is transferred to the completed output section 63 of the computer 55, which is then transferred through a suitable lead **63*a* to the input section 59 of the teletype data printer 60. This data is simultaneously impressed upon the data output section 61 and printed output section 62. The data impressed upon the data output section 61 is transferred to the magnetic tape data storage means 65 so as to be reinserted into its appropriate memory location, thereby constituting an updated presentation of transactions occurring at its associated keyboard input station. The updated transaction which is transferred to the data output section 62 is printed upon the paper web 64 shown in the inset 51** which now provides a print-out of all transactions as well as all computed data.

Transactions of all other keyboard input stations are carried out in a like manner.

FIGS. 3*a* and 3*b* show top and side views of the photographing and conveying assembly 70. The assembly is provided with a housing 71 whose top portion is provided with a suitable opening for receiving and positioning the keyboard input station panel 21, as well as its associated electronics. As can clearly be seen, the top surface of the housing 71 is substantially flush with the table top 72 of a gaming table or other suitable surface. The housing 71 is provided with an elongated opening 73 arranged immediately adjacent the keyboard panel which is designed for the receipt of currency taken in in return for chips. The housing is secured to the table top by means of L-brackets 74 coupled to the table top and to the vertical sides of the housing 71 by suitable fastening means.

One side 75 of the housing has mounted thereto a motor 76 coupled to a source of energy through a switch means contained within the keyboard electronics. The switch means is normally open, and is closed upon insertion of the operator's edge-coded card to energize the motor. A light source 77 to illuminate the bills in a manner to be more fully described is mounted at one side of the housing is likewise energized by the aforementioned switch means for the purpose of illuminating the currency received by the gaming table operator in order to enable the photographing process to be performed.

A camera 78 is secured to another vertical wall 79 of the housing so that its lens 80 protrudes through a suitable opening provided therein for the purpose of photographing the currency. The camera may, for example, be an 8- or a 16-millimeter camera whose motor (or solenoid, if desired) is energized in order to advance a single frame for each bill inserted into the housing in order to provide a photographic record of each such bill. The frame-advancing motor (not shown) of the camera 78 is also electrically coupled to the switch means provided in the keyboard panel in order to permit step-like advancement of the film in the camera. The housing further includes a microswitch 81 having a sensitive switch arm 82 which is positioned immediately beneath the opening 73 and in the path of any currency inserted therein so as to be depressed, closing the switch for the purpose of advancing the camera film one frame, lighting the light source and stepping an electromagnetic counter 83 which keeps a count of the total number of bills deposited in the unit. If desired the microswitch may be replaced by a photocell and separate light source.

The bottom of housing 71 is provided with an opening 84, permitting the passage of currency through the conveying means so as to enter into a currency receptacle 85. The currency receptacle 85 is releasably secured to the underside of housing 71 to permit its periodic removal for the purpose of transporting the receptacle to a suitable place for removing its contents and counting same. One preferred currency receptacle may, for example, be of the type described in issued U.S. Pat. 3,292,849. Since the actual receptacle employed lends no novelty to the system of the instant invention, no further description will be given herein. It should be obvious that any other receptacle may likewise be employed, if desired.

The motor means 76 has its output shaft coupled through a suitable coupling (not shown) to a shaft 86 journaled within bearings 87 and 88 supported by opposite vertical sides of housing 71. A pair of rollers 89 and 90 are mounted on shaft 86. A similar shaft 91 positioned substantially below shaft 86 and slightly offset from shaft 86 is journaled within suitable bearings (not shown) similar to the bearings 87 and 88, and is further provided with a pair of rollers 92 and 93 secured at spaced intervals along shaft 91 so as to be substantially in alignment with rollers 89 and 90. The rollers 89–92 receive a belt which is arranged to form a closed loop and which is tightly wound about the rollers. A similar belt 95 is wound about rollers 90–93.

The opening 73 provided in the top of housing 71 has two downwardly depending sides 73*a* and 73*b*. A piece of glass or other transparent material 96 has its upper marginal edge secured to the interior surface of downwardly depending sides 73*b* of opening 73 and extends downwardly at an angle offset from the vertical direction with its lower edge 96*a* positioned immediately adjacent to, but spaced from, a pair of rollers 97 and 98 which are mounted upon a shaft 99 journaled in suitable bearings (not shown) secured to opposite vertical sidewalls of the housing 71. The rollers are rigidly secured to the shaft and are so positioned along shaft 99 so as to frictionally engage belts 94 and 95, respectively, for a purpose to be more fully described.

The lower opening 84 has a pair of inclined sidewalls 84*a* and 84*b* which are cut with suitable slots (not shown) so as not to interfere with belts 94 and 95 and rollers 97 and 98, and which are provided to guide currency passing from the conveyor means into the currency receptacle 85.

The transparent member 96 is provided with a suitable opening (not shown) in order to permit the sensitive arm 82 of microswitch 81 to protrude therethrough and be positioned in the path of movement of currency.

The operation of the conveying and photographing means will now be described with reference to FIGS. 3*a* through 3*c*. Upon insertion of the operator's card into the keyboard station, the power source 100, which may be any suitable A-C or D-C power source (depending only upon the needs of the user) is coupled through a keyboard switch 101 which is normally in the open position and which is closed as a result of insertion of the operator's edge-coded card to couple the power source directly to motor 76. The energization of motor 76 causes rotation of its output shaft and hence shaft 86. The rotation of shaft 86 is imparted to rollers 89 and 90 rigidly secured thereto, which, in turn, causes the belts 94 and 95 to rotate. Rollers 92 and 93 maintain the belts substantially taut and are free to rotate under control of the moving belts.

Each bill received from a party purchasing chips is inserted through the table top opening which is aligned with the housing opening 73 in the direction shown by arrow A. As each bill is inserted into the opening, its bottom edge presses against the sensitive arm 82 of microswitch 81, causing a closure of the switch and thereby energizing the illuminating source 77, the motor of camera 78 and the electromagnetic counter 83. The illuminating source or lamp 77 causes light rays to pass through the transparent member 96 and to illuminate the bill inserted into opening 73. Since the denomination of each bill appears on both sides of the bill, it is in general immaterial which side of the bill faces the camera for photographing purposes. However, if desired, indicia 102 may be provided immediately adjacent opening 73 which may comprise an arrowhead together with instructional message indicating that the front of the bill is to be on the side facing the arrow or indicia 102.

The light rays impinging upon the bill are reflected from the surface of the bill at different degrees of intensity in accordance with the pattern of the bill. These rays then impinge upon a mirror or reflecting surface 103 so as to be directed toward the lens 80 of camera 78 in order to form an image of the bill inserted into the opening on the frame of the film strip (not shown) provided in the camera.

The bill dropped into opening 73 falls under gravity into the opening and any surface contact made with the friction drive belts 94 and 95 will assist it in moving vertically downward. In any case, the lower edge of the bill will reach the position immediately above the frictional engagement between belts 94–95 and associated rollers 97–98, causing the bill to be "kicked" rapidly through the opening 84 and to be guided therethrough by the inclined sides 84*a* and 84*b* of the opening. It should be noted that the transparent member 96 and belts 94–95 are inclined so as to form a tapered hollow opening for receipt of the bill so that the bill will not be urged rapidly until it substantially reaches a depth slightly above the top edges of rollers 92–93 and 97–98. The insertion of each additional bill is handled in a like manner. The camera, if desired, may be a cartridge load type to facilitate removal of the film for subsequent development. If desired, the camera may be provided with a lock to deny access thereto by unauthorized personnel or by personnel not holding a key to the camera. The lock box, once filled or at other suitable periodic intervals, may be dismounted from housing 71, and taken to a suitable place for removal and counting of the currency. The film cartridge of the camera may be removed at the same time, or need only be removed at those times when a checking operation (to be more fully described) is to be performed.

Preferably, the currency intake is counted at predetermined intervals. The results of the counting operation may then be compared against the computational results performed by the cash flow system computer during the manual counting operation and a notation of the total number of bills counted is made. If, for any reason, a discrepancy exists between the total amount of currency taken in and the computational results performed by the computer of the cash flow system, the readings of each of the counters at the keyboard input stations may be taken and summed in order to determine whether any discrepancy also exists between the total number of bills counted and the total number of bills indicated as having been received at each keyboard input station counter. Further discrepancies may be indicated by development of the film provided in each photographing means so as to permit the summation of the bill denominations photographed to be made and compared against the actual cash intake. It can, therefore, be seen that the system provides a number of cross-checks in order to determine any possible sources of error or mistake within the cash flow system.

FIGS. 4*a* through 4*d* show the electronics of the keyboard input stations. FIG. 4*e* indicates the manner in which FIGS. 4*a* through 4*d* should be arranged in order to provide the full layout of the keyboard station electronics. The keyboard station electronics 150 shows the manual input keys in schematic fashion in the form of push-button switches 23–"0" through 23–"9," all connected to a common bus 151. The function keys 24 through 27 are also shown connected to the same common bus which, in turn, is coupled through a resistor and capacitor R1 and C1 to reference or ground potential. One exception, however, should be noted. The minus function key is not directly coupled to bus 151, but is coupled through the push-button switch 37 which represents the key operated lock of the keyboard preventing the minus dollars function from being activated unless authorized personnel, such as a pit boss, is made aware of the incorrect entry by the operator and is called upon to assist the operator in rectifying it. Briefly, the operation of the key is such that:

If the operator, even after having viewed the visual display, enters an incorrect amount of plus dollars above and beyond what should have been entered, this necessitates a transaction of minus dollars by an amount sufficient to correct the overall amount as between the two transactions (i.e., plus and minus dollars). It is the operator's function to call upon the pit boss, explain to him the situation, and request that the key be inserted so that a minus dollars transaction can be placed into the keyboard.

The clear display push-button 28 is represented as a push-button switch connected in series with common bus 151 to clear an incorrect display at a time when the operator recognizes the error and before a function key os depressed.

Each of the groups, namely, the decimal number key group and the function key group, is arranged to complete an electrical connection to one of a plurality of vertical lines 152, 154 (i.e., conductors) which, in turn, are selectively coupled to a plurality of horizontally aligned (i.e., row conductors) 153, 155 through a plurality of diodes 156 so as to form a diode code converter which is employed for converting decimal numbers into a binary code and for converting the function key symbols into another binary code for transmission and computer reduction purposes, it being well understood that the decimal codes are ideally adapted for use in electronic computers. The decimal matrix is comprised of column conductors 152 and row conductors 153 and employs diodes 156 which are selectively coupled between the row and column conductors in order to produce a binary coded representation peculiar to each decimal key of the keyboard. The column conductors 154 in the function matrix are selectively coupled to row conductors 155 by diodes 156 for coding functions into memory. The row conductors in the first matrix are coupled to a plurality of inverter circuits **157*a* through 157*d* which have their outputs coupled to the input terminal on the set-side of bistable flip-flops 159*a* through 159*d* which form a keyboard memory. The memory is further comprised of additional vertical groups of flip-flops 160*a*–160*d* through 162*a*–162*d***, thereby providing a memory capable of storing four, four-bit binary words. It can be seen that the sixteen bits are arranged in a regular four-by-four matrix. Obviously, any other size memory may be employed, depending only upon the needs of the user. The actual arrangement of the memory and its storage capacity lend no novelty to the instant invention.

The row conductors 153, in addition to being coupled to inverters **157*a* through 157*d*, respectively, are directly coupled to the RESET input terminals of bistable flip-flop circuits 159*a* through 159*d***, respectively. The operation of reading coded characters into memory is as follows:

Let it be assumed that the transaction in the amount of $75.00 is to be read into memory. This means that the decimal 7 key must first be depressed. When key 23–"7" is depressed, the current passes from ground or reference potential through capacitor $C_1$, resistor $R_1$, bus 151, closed switch 123–"7" and three of the diodes 156 which couple the column conductor to row conductors **153*a*, 153*b* and 153*c*, respectively. Since the row conductors 153*a* through 153*d* are given binary weights "1," "2," "4" and "8," it can be seen that placing conductors 153*a* through 153*c* in contact with ground potential places these three ones in the binary ONE state, giving a total of 1+2+4 or 7. Thus, the binary representation 1 1 1 0 is the coded representation for decimal "7." The capacitor $C_1$, which is fully charged, begins discharging through the three above mentioned paths as well as a path through conductor 180. Considering the left-most column conductor 180, it can be seen that the conductor is coupled to all of the row conductors of the code conversion matrix, so that any code generated by depression of any of the number keys 23 establishes a current path (which is really a transient pulse occurring upon closure of the push-button) with the conductor 180. For the purpose of simplicity, the five row conductors 153 and bus 180** leading to related circuits are shown as one conductor. However, it should be understood that these conductors are not connected in common, but are just combined together to form a single cable, and are at all times electrically insulated from one another.

The impression of a transient signal upon the column conductor 180 is passed through this conductor to emerge in the left-hand of drawing **4*a*–4*d***, and is coupled into the input of a transistor $T_1$ (see FIG. 4*b*) which is connected in a cascading fashion to transistors $T_2$ through $T_4$ to form a pulse shaping circuit 182. One output signal from the pulse shaping circuit appears at terminal 183 while another output signal appears at terminal 185. The application of a transient upon the base of transistor $T_1$ causes pulse, as shown at 184. Preferably, this pulse has a pulse duration of 45 milliseconds to permit the performance of all desired functions. The pulse shaper further generates an output signal at 185 which is a negative going pulse 186 whose leading edge occurs simultaneously with the leading edge of pulse 184, and whose pulse duration is approximately 2.5 milliseconds. The pulses are passed through conductors 183 and 185 and are impressed upon the cathodes of diodes $D_1$ and $D_2$ (FIG. 4*d*) whose anodes are connected in common to form a diode AND gate. The AND gate functions such that when both levels at their cathodes are simultaneously at reference potential, which occurs at the trailing edge of negative going pulse 186, transistor $T_5$ is biased into cut-off which is substantially minus 11 volts. This voltage is applied to the base of transistor $T_6$, driving this transistor into conduction. Transistor $T_6$ remains conductive until the occurrence of the trailing edge of positive going pulse 184, at which time it is driven into cut-off as a result of the AND gate action of diodes $D_1$ and $D_2$, thereby forming a positive going shift pulse 187 having a pulse duration of 45 minus 2.5 milliseconds, or 42.5 milliseconds. The 42.5 millisecond pulse 187 has its trailing edge occurring substantially simultaneously with the trailing edge of negative going pulse 186. The 2.5 millisecond delay is provided to overcome any ill effects caused by contact bounce due to the closure of one of the decimal input keys 23–"0" through 23–"9" so that no transient aspects of the contcat bounce will have any deleterious effect upon the keyboard operation.

The output of the transistor $T_6$ (shift pulse 187) is applied to a common bus 188 which, in turn, is coupled to the shift pulse buses 189 through 192 of the four-by-four flip-flop matrix. This shift pulse causes bistable flip-flops **159*a* through 159*d* to shift their contents (in the present example 1 0 0 1) to the next memory stage comprised of bistable flip-flops 160*a* through 160*d*, respectively, in a manner to be more fully described, as well as providing the loading operation for flip-flops 159*a*–159*d*. The keyboard input station is now ready for accepting the next decimal input number. This is performed simply by depressing a selected one of the decimal input keys 23–"0" through 23–"9" for the purpose of entering the next decimal number. The transient pulse generated with the push-mutton closure is coupled through the first code conversion matrix to the SET and RESET input terminals of bistable flip-flops 159*a* through 159*d*. The 42.5 millisecond pulse (i.e., shift pulse 187**) is generated with the push-button closure is coupled through shift each stored number one stage to the left in the memory until all four stages are occupied by the number desired to be transmitted. Obviously, less than four stages can be employed if the number desired to be transmitted has less than four digit positions. Entry of any number of more than four digit positions will simply cause the first number entered to be shifted out of memory, and this number will be lost.

The manner in which each flip-flop element operates under the control of shift pulses and input pulses can best be understood from a consideration of the schematic diagram of a flip-flop, as shown in FIG. 4*f*, which further shows its block diagram configuration.

Shift pulses are applied to the shift line 200, which is similar to any of the shift lines 189 through 192, shown in drawings 4*a* through 4*d*. The shift pulse is applied through a pair of capacitors C2 and C3 and diodes D3 and D4 to the base electrodes of transistors $T_7$ and $T_8$. The emitter terminals of the transistors which are shown as being connected to SET and RESET terminals, to be more fully described, are, for all practical purposes, connected to ground or reference potential. The collectors of transistors $T_7$ and $T_8$ are coupled through resistors R8 and R9, respectively, to —11 volts. The base electrodes are further coupled through resistors R4 and R5, respectively, to +11 volts. The transistors are cross-coupled so that the parallel combination of R3 and C5 couple the collector of transistor $T_8$ to the base of transistor $T_7$. The collector of $T_7$ is coupled through the parallel combination of C4 and R2 to the base electrode of transistor $T_8$. The resistor R6 is coupled to one of the input terminals of one of the inverters, such as, for example, the inverter 157*a*, while the resistor R7 is coupled to the output terminal of the same inverter. The operation of the flip-flop is as follows:

Let it be assumed that one of the decimal keyboard pushbuttons 23 is depressed, and that its associated column conductor is coupled through a diode to the input of the above mentioned inverter 157*a*. This will cause the input terminal of the inverter to be at a negative going voltage charging at the rate of the capacitor C1, previously mentioned, so that the output terminal of the inverter will be positive going. Thus, positive potential or a positive going signal will be applied to resistor R7, while a negative going potential will be applied to resistor R6. During the first 2.5 milliseconds after contact closure, which is the time required for the pulse shaping circuit previously mentioned to generate shift pulse 187, capacitor C1 discharges from —11 volts to approximately —6 to —8 volts, which signal is applied to the common terminal 201 between diode D4, resistor R6 and capacitor C2. The minus signal is insufficient to change the state of the flip-flop circuit. As soon as the shift pulse 187 is generated, it will be applied to shift line 200. Since the voltage level across the capacitor cannot change instantaneously, the voltage at the above mentioned common terminals 201 and 202 will jump by an amount equal to the amplitude of shift pulse 187 which is approximately +6 volts. Thus, if the output terminal of inverter 157*a* is approximately 0 volts, terminal 202 will jump to approximately +6 volts. The input terminal to inverter 157*a*, which is approximately —6 to —8 volts will jump to a value just slightly below 0 volts or reference potential. Due to the polarity of diode D4, no signal will be applied to the base electrode of transistor $T_7$. However, due to the fact that terminal 202 jumps to approximately +6 volts, the polarity of diode D3 will apply this voltage to the base electrode of transistor $T_8$, causing it to turn OFF. If transistor $T_8$ was previously turned OFF, the flip-flop will remain in the same state. If transistor $T_8$ was previously turned ON, it will now turn OFF, causing its collector to go to —11 volts, which will be applied to the base of transistor $T_7$, causing this transistor to turn ON. The capacitor C1 is normally at —11 volts before the closure of any of the decimal push-buttons or function push-buttons. Before any keyboard operation begins, capacitor C1 is fully charged so that it has approximately 11 volts across its terminals. When any one of the decimal input keys is depressed, the capacitor begins discharging through one or more current paths as a result of the diodes which couple the keyboard column conductor to the memory and to the pulse-shaping circuitry. The discharge path is such that after an elapsed time of approximately 2.5 milliseconds, i.e., the initiation of the shift pulse, the capacitor C1 is discharged to a level of between —8 to —6 volts. When the voltage level reaches this range, it is sufficient to cause operation of any of the inverter circuits 157*a* through 157*d* to which it may be applied as a result of the code conversion matrix. Any one of the inverters receiving the level at this time will thus be turned ON as a result of receiving the voltage level in the —6 to —8 volt range. Obviously, any inverter which is not coupled through the code conversion matrix to the discharging capacitor will be coupled through one of the resistors R10 through R14 and the column conductor 203 to reference potential, which will not turn ON the inverter, causing its collector to be at approximately —11 volts. Thus, any inverter which is turned ON will have a voltage of —6 to —8 volts at its input and reference or 0 potential at its output, while any inverter which is not turned ON will have reference potential at its input and approximately —11 volts at its output.

The shifting operation is performed as a result of the collector electrode of each of the transistors comprising each flip-flop being cross-coupled to the input terminals of the next stage flip-flop in the same row. For example, the output terminals of flip-flop 159*a* will be cross-coupled to the input terminals of the flip-flop 160*a*. Since the shift pulse is simultaneously applied to each of the shift lines 189 through 192, the state of each of the flip-flops 159*a* through 159*d*, which have received the first decimal number loaded into the memory will cause this stored coded decimal number to be shifted to the next stage or set of flip-flops 160*a* through 160*d* such that the shift operation is performed in substantially the identical manner as the loading operation of each of the flip-flops 159*a* through 159*d*, which are coupled to the input and output terminals of inverters 157*a* through 157*d*. For example, if the transistor $T_8$ of flip-flop 159*a* is ON, and its transistor $T_7$ is OFF, the collectors of these transistors will be approximately at reference or 0 potential and —11 volts, respectively. These voltage levels will be applied to resistors R6 and R7, respectively (see FIG. 4*f*), causing the transistors $T_7$ and $T_8$ of flip-flop 160*a* to be turned OFF and ON, respectively, or in any case, to be in the same state as flip-flop 159*a* from which the digit state is being shifted. This operation continues until the capacity of four decimal digits is reached, which is the storage capacity of the memory. If a fifth decimal digit is attempted to be loaded into the memory, this will cause the first decimal digit which was loaded into the memory to be shifted out of the left-hand end of the memory and lost.

Figure 4D:
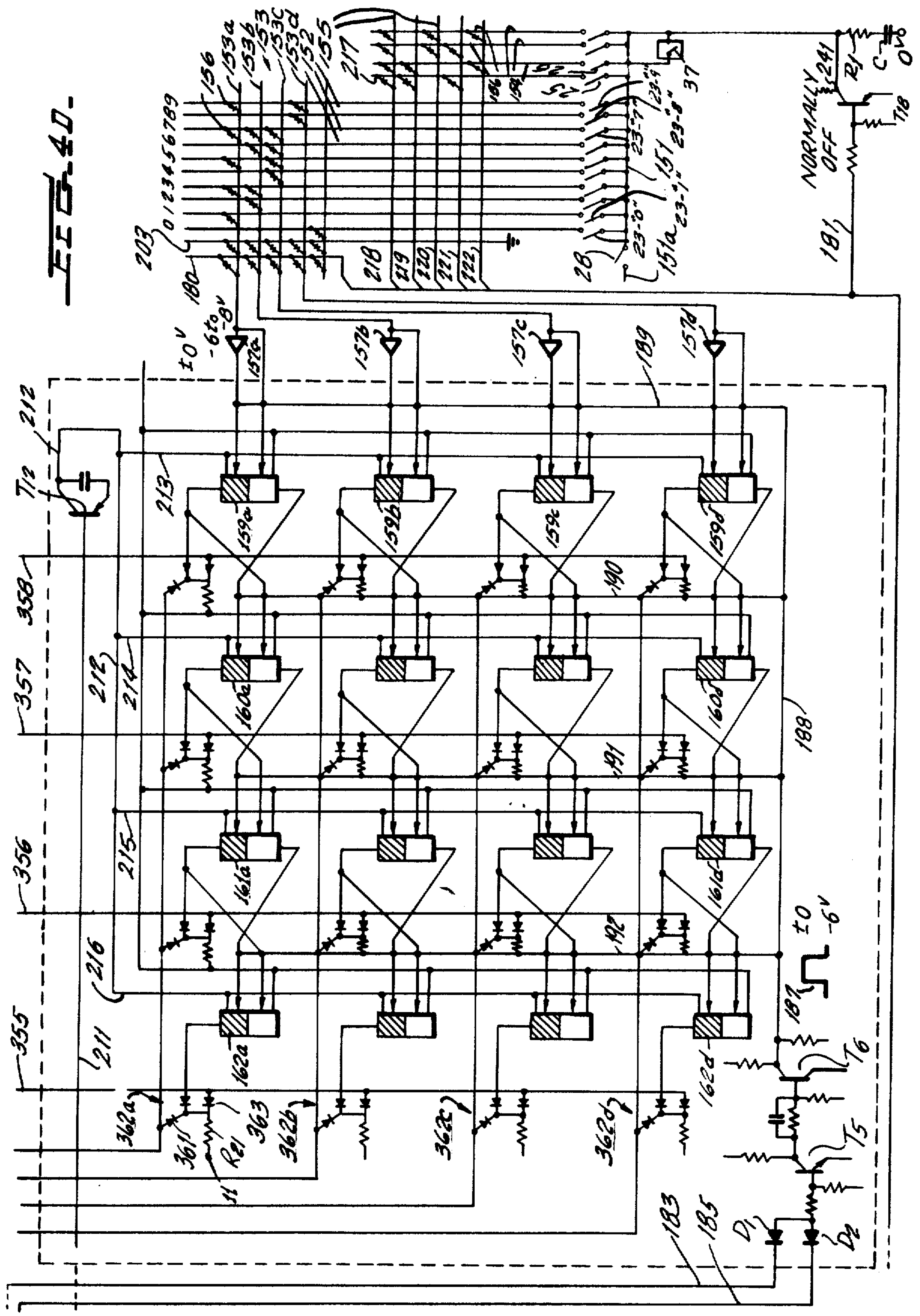

As was previously mentioned, the keyboard input line 180 applies a transient signal to the pulse-shaping circuit 182 which generates pulses 184 and 186 employed to form the shift pulse 187, previously described. The output terminal 185 of the pulse-shaping circuit, in addition to being applied to the AND gate comprised of diodes D1 and D2, is simultaneously applied to one input terminal of a bistable flip-flop circuit 205 whose output terminal 206 goes to the binary ZERO or reference level potential and remains in this state until reset in a manner to be more fully described. This level is applied to a transistor circuit 207 comprised of a transistor $T_{11}$ whose collector output goes to —11 volts, in order to condition an AND gate 208 for subsequent operation. The other input terminal 210 of AND gate 208 is coupled to conductor 151*a* which is coupled to the common bus 151 through the CLEAR display push-button 28. When the CLEAR display push-button 28 is depressed, this level, namely, the negative voltage level of the discharging capacitor C1, is applied to input terminal 210 of AND gate 208 which is coupled through its output terminal to a conductor 211 so as to be applied to the base electrode of a transistor $T_{12}$ (FIG. 4*d*). The collector of transistor $T_{12}$ is coupled through conductor 212 which is a common bus for each of the input lines 213 through 216 which removes ground or reference potential from the input terminals or emitter terminals of each of the $T_8$ transistors for each flip-flop in the memory. This automatically causes all of the flip-flops in memory to have their $T_8$ transistors turned OFF, causing the entire display of the display tubes (to be more fully described) to be turned OFF, and preventing any display whatsoever from being illuminated, including the display of the decimal number "0."

After a decimal number has been entered into memory and the operator has examined the visual display and is satisfied that it is correct, the appropriate function key may now be depressed. Obviously, if the display is incorrect, the operator can determine this from an observation of the visual display, depress the CLEAR display push-button 28, and cause the entire memory to be RESET or CLEARED in the manner previously desecribed. Let it be assumed that the operation being performed by the operator is that of the sale of chips in return for cash. For this operation, the operator will now depress the plus dollars push-button 25 which is coupled to column conductor 217 in order to impress a minus voltage through one of the matrix diodes to the SET RT conductor 218, the SET dollars conductor 219, and the SET plus conductor 221.

Considering first the SET RT conductor 218, this conductor is coupled to the input terminal of a pulse-shaping circuit 223 comprised of transistors $T_{14}$ through $T_{17}$. The transient signal applied to the input of the pulse-shaping circuit generates one output pulse 225 at the collector terminal 224 of transistor $T_{16}$ and generates a second output pulse 227 at the collector terminal 226 of transistor $T_{17}$. These two pulses are applied to the inputs of an AND gate 228 which generates a negative going pulse 229 at its output terminal 230 when both input pulses 225 and 227 are positive, so that the leading edge of the resulting pulse 229 occurs substantially at the time of the trailing edge of pulse 227. This resultant pulse is applied to one input terminal 232 of a bistable flip-flop 231, causing its output terminal 234 to go positive, and its output terminal 235 to go negative. The output terminal 234 is coupled to an inverter 236 which inverts the output state at terminal 234, providing a negative level at its output terminal 237, which is the logic "1" level, which provides an indication to the scanner-recorder (to be more fully described) for the purpose of signifying a transfer request. Input terminal 233 of bistable flip-flop 231 is coupled to the output of an inverter 238 which receives a return signal from the scanner-recorder to reset the bistable flip-flop once the bid signal has been acknowledged and transfer of the data has taken place.

Output terminal 235 of bistable flip-flop 231 is simultaneously applied to conductor 240 and keyboard lock conductor 181. The output terminal 235 is at logic 1, or negative potential, which couples negative potential to the base electrode of transistor $T_{18}$ (FIG. 4*d*), turning the transistor ON and causing its collector to go to 0, or reference potential, for the purpose of rapidly discharging capacitor C1. Since bistable flip-flop 231 remains in the state to which it has been set, the flip-flop maintains transistor $T_{18}$ turned ON, maintaining the level at its collector terminal 241 at 0 volt (reference potential) so as to defeat operation of any of the keyboard keys. For example, if any of the keyboard keys are depressed after the setting of bistable flip-flop 231 in the manner previously described, the 0 volt level (reference potential) at the collector terminal 241 of transistor $T_{18}$ will prevent any of the circuits from being activated so that the display already placed into memory will be maintained at least until an acknowledge signal is received from the scanner-recorder indicating that the data at the keyboard has been successfully transferred.

Considering now the SET Dollars line 219, the negative level resulting from a depression of key 25 is applied to one input terminal 243 of a bistable flip-flop 244, causing its output terminal 245 to go positive and its output terminal 246 to go negative. The output terminals 245 and 246 are coupled through conductors 247 and 248, respectively, which are each, in turn, applied to one input terminal of the AND gates 262 and 264, respectively. The other input terminals of AND gates 262 and 264, as well as AND gates 260, 261 and 263 are coupled to a common bus 265 and a gate 266 which has its input coupled to −11 volts through a resistor R20 and diode 267. This causes a negative potential, or logic 1 level, to be applied to one input of each of the gates 260 through 264. Since gate 264 receives a positive level, it will not be turned ON and −11 volts will be applied through conductor 268 to one terminal of the chips (C) lamp 31 (see also FIG. 2*a*). Gate 262, however, will receive negative or logic 1 signals at both of its input terminals, causing its output terminal to go positive, which is applied through a diode and conductor 269 to the dollars ($) lamp 30 (see also FIG. 2). Thus, the chips lamp 31 will not be lit, and the dollars lamp 30 will be lit, which should be the case.

The output terminal 246 is further applied through an inverter 270, which is coupled through conductor 271 to the scanner-recorder in order to provide an indication that a dollars transaction is being conducted.

Turning now to the SET plus (+) conductor 221, the negative level is applied to one input terminal 273 of a bistable flip-flop 272, causing its output terminals 274 and 275 to go to logic 1 and logic 0 levels, respectively. The conductors 274 and 275 are respectively connected to input terminals of AND gates 261 and 263, respectively, causing them to be turned ON and OFF, respectively, so as to apply 0 (reference) and negative potentials to conductors 276 and 277, causing the plus (+) lamp 33 to be lit and the minus (−) lamp 32 to remain OFF, which should be the case. See also FIG. 2, which shows the plus and minus lamps 33 and 32, respectively, in the keyboard arrangement.

As was previously described, the operator's edge-coded card must first be inserted into the keyboard slot to activate the keyboard. The insertion of the edge-coded operator's card causes the normally open switches of switch array 300 (FIG. 4*a*) to be selectively closed, in accordance with the edge-coding of the card. A first switch 301, which is normally open in the absence of the card, as shown by the solid line position, moves to the dotted line position in order to couple a 250-volt source through the closed switch 301 and conductor 302 to the visual display assembly, to be more fully described.

A second switch 303, which is normally closed as shown by the solid line position, is moved to the dotted line position in order to remove ground or reference potential from conductor 304 which is coupled through diode 267 and gate 266 to the AND gate group 260 through 264, and which is further coupled through diode 305 to conductor 240, which applies negative potential to input terminal 245 of bistable flip-flop 231 in order to reset the flip-flop. The next three switches 307 through 309 form a first octal-code group 306 which are employed to represent the most significant octal-code bit $8^2$, which forms the operator's identifying number. All of these switches are normally in the open position, as is shown in solid line fashion. The next two switch groups 310 and 314, which are comprised of switches 311–313 and 315–317, respectively, form the remaining two octal-code groups for the $8^1$ and $8^0$ position. The three octal-code groups 306, 310 and 313 provide a maximum of 512 combinations, thereby enabling as many as 512 operators to each have a unique identifying number. The switches are selectively closed, depending upon the particular operator's card inserted into the circuit. The next three switch positions 318 through 320, which are shown as not being wired, are provided to be used by the customer for additional functions which may be required. The remaining switch position 321, which is normally in the solid line position, is coupled to a suitable voltage source 322 and is moved to the dotted line position to couple conductor 323 to the conveying and photographing means, previously described, in order to provide suitable power for their operation.

The switches 307–309 of switch group 306 each have their input terminals coupled through diodes 324 through 326, respectively, for the purpose of receiving a pulse from the scanner-recorder which is applied through conductor 327, inverter 328 and conductor 327*a* to one terminal of each of the switches. The other terminals of switches 307–309 are coupled to conductors 329 through 331, respectively, which are output lines going to inverters 332 through 334, respectively, having their outputs coupled to lines 335 through 337, respectively, which are coupled to the scanner-recorder for the purpose of recording the operator's identifying information in the manner to be more fully described.

The input terminals of switches 311 through 313 are coupled to diodes 338 through 340, respectively, which, in turn, are coupled to a common bus 341. An input line coming from the scanner-recorder is coupled to keyboard line 342 and passes through inverter 343 and bus 341 to diodes 338 through 340 to power the switches 311 through 313.

A third input line 344 is coupled through inverter 345 and bus 346 to diodes 347 through 349 which powers the switches 315 through 317, respectively, whose outputs are connected to lines 329 through 331. The sequence of operation is such that a pulse is first applied to line 327, then to line 342, and then to line 344 in sequential fashion, causing the output states of the switch groups 306, 310 and 314, respectively, to appear simultaneously by bit and serially by bit group at the output lines 335 through 337 which return to the scanner-recorder for recording purposes.

It should be noted that lines 327, 342, 344 and additional line 350 each receive pulses in sequential fashion from the scanner-recorder and apply these to buses 352, 353, 341 and 346, respectively, which buses are simultaneously coupled to read-out lines 335 through 337, respectively, going to the memory and to the base electrodes of transistors $T_{20}$ through $T_{23}$ provided in the display circuitry 360.

Considering first input line 352, the signal received from the scanner-recorder is applied to read-out line 355 going to the left-handmost bistable flip-flops 162*a* through 162*d*. Line 355 is coupled to one diode 363 of an AND gate comprised of diodes 361, 362 and output diode 363. All diodes have their cathodes connected in common to a resistor $R_{21}$ whose other terminal is connected to a —11 volt source. During the first synchronizing pulse received from the scanner, and which is applied to bus 352, a negative pulse is applied to diode 363. If the output line of flip-flop 162*a* is positive, indicating that no logic 1 bit is stored in the flip-flop, then the output terminal of the AND gate, which is coupled through diode 361, is applied to an inverter circuit 369*a* and a conductor 370 to be simultaneously applied to conductor 364 which, in turn, is coupled through an inverter circuit 365 and conductor 366 to be returned to the scanner-recorder for the purpose of recording the bit state of that bit position in the scanner. Conductor 364 is simultaneously coupled to the base electrode of a transistor $T_{24}$ which is one of four transistors $T_{24}$ through $T_{27}$ forming the code converting circuitry 365 for the display tubes, to be more fully described. It can clearly be seen that all four flip-flops 162*a* through 162*d* simultaneously receive a negative pulse from sense line 355 to condition the remaining AND gates 362*a* through 362*d* for the left-handmost decimal digit stored in memory. Their outputs are applied to inverters 369 through 369*d*, respectively, which are coupled to buses 372 through 374, respectively, so as to simultaneously apply the output level of the flip-flops to base electrodes of transistors $T_{25}$ through $T_{27}$, respectively, and to inverter circuits 375 through 377, respectively, which have their outputs connected to lines 378 through 380, respectively, so as to simultaneously transfer the bit states of all four bit positions of the left-handmost flip-flops 162*a* through 162*d* to the scanner for recording purposes.

Each of the transistor circuits $T_{24}$ through $T_{27}$ has two output terminals 380 through 383 and 380*a* through 383*a*, respectively, which are provided for the purpose of selectively driving the transistors $T_{28}$ through $T_{39}$ also forming part of the display conversion circuitry to operate display means 360.

For the purpose of understanding the circuitry, let it be assumed that the decimal number 9 is stored in the left-handmost flip-flop group 162*a* through 162*d*. The levels will then be 1 0 0 1, respectively. These levels will be inverted by inverters 369*a* through 369*d* to generate levels 0 1 1 0. These outputs will then be applied to the bases of transistors $T_{24}$ through $T_{27}$ so that their output terminals (as a result of second inversion operation) will have their collector terminals 380*a*, 381*a*, 382*a* and 383*a* at 1 0 0 1 level, respectively. Their input terminals 380, 381, 382 and 383 will be at 0 1 1 0, respectively. All of the output terminals are selectively connected to certain ones of the transistors $T_{28}$ through $T_{39}$ with the input connections to these transistors being shown in parentheses. For example, the output terminals 380*a* and 383*a* of transistors $T_{24}$ and $T_{27}$, respectively, will be at 1 levels, thereby applying 1 levels to the base of transistor $T_{28}$ and the bases of transistors $T_{30}$ and $T_{31}$ through coupling diodes 384 to transistors $T_{32}$ and $T_{33}$ to another coupling diode 384 and to the bases of transistors $T_{34}$ and $T_{35}$ and $T_{36}$ and $T_{37}$ through associated coupling diodes. It can clearly be seen from the polarity of the coupling diodes 384 that a negative pulse applied to any one of these diodes will cause its associated transistor, or transistors, to be rendered conductive. For example, considering the fact that a decimal 9 is to be transmitted, as was previously described, output terminals 380*a* and 383*a* are at the logical 1 level. Output terminal 380*a* is coupled to the base of transistor $T_{28}$, causing this transistor to be cut off, due to the fact that it is an N-P-N type transistor. Output terminal 380, which is at logical 0, or positive level, is applied to the base of transistor $T_{29}$, rendering it conductive. As can clearly be seen, the collector of transistor $T_{29}$ is coupled to the emitters of transistors $T_{31}$, $T_{33}$, $T_{35}$, $T_{37}$ and $T_{39}$ so that all of these transistors will be conditioned to conduct. In a like manner, if an even number (0, 2, 4, 6, 8) were to be illuminated in the display and transistor $T_{28}$ were rendered conductive, its collector can then be seen to be connected to the emitters of transistors $T_{30}$, $T_{32}$, $T_{34}$, $T_{36}$ and $T_{38}$, enabling these transistors to be conductive. Returning to the example of illuminating a decimal 9, transistor $T_{29}$ will be conductive, and transistors $T_{38}$ and $T_{39}$ will be conditioned to be conductive, since the output terminals 381*a*, 382*a* and 383 will all be positive. However, only transistor $T_{39}$ will be conductive due to the fact that transistor $T_{28}$ is in cut-off, and $T_{29}$ is conductive, since an odd number (1, 3, 5, 7, 9) is being transmitted. Thus, the collector of transistor $T_{39}$ will be coupled to the illuminating or Nixie tube of the display.

Before any further consideration of the operation is given, a basic understanding of the Nixie, or display tube, will first be given. Each display, or Nixie tube, has one anode terminal connected in common to each of ten filaments and ten cathode terminals, only one of which will be connected in circuit at any given instant. All of the cathode terminals are coupled to a different filament, which filament is formed in the shape of a decimal number, hence the reason for ten cathode terminals to represent the decimal numbers 0 through 9. In operation, it is desired that only one such filament will be illuminated at any given instant so that the display can be clearly read and understood. In the instant invention, each of the collector terminals of transistors $T_{30}$ through $T_{39}$ are coupled to the associated filaments of all four display tubes, four display tubes being used here to display any number from 0 0 0 0 to 9 9 9 9. Thus, for example, the collector of transistor $T_{30}$ is coupled to the "0" cathode of all four display tubes 391 through 394; the collector terminal of transistor $T_{31}$ is connected in common to the "1" cathode of all four tubes 391 through 394, and so forth. If appropriate circuitry were not provided, this would mean that with transistor $T_{39}$ being rendered conductive, all four display tubes would have their "9" cathode in circuit, rendering a display of 9 9 9 9. However, let it be assumed that the decimal number 9, which is to be displayed, should be illuminated in the left-handmost display tube 391. This is achieved by providing cycling pulses $\overline{DT_1}$–$\overline{DT_4}$ generated at the scanner-recorder so that the number to be displayed at any time will be displayed in its correct digit position and in no other. These cycling pulses are applied from the scanner-recorder upon the lines 352, 353, 341 and 346 and are applied to the bases of transistors $T_{20}$ through $T_{23}$ in a sequential fashion. The collectors of these transistors are coupled through suitable resistors to the 250 volt bus 302, previously described. This bus is further coupled through a resistor R30 to the collectors of transistors $T_{40}$ through $T_{43}$, respectively. Let it be assumed that a synchronizing pulse is applied to the base of transistor $T_{20}$. The negative going pulse renders the transistor non-conductive, causing its collector to go toward +250 volts. This applies 250 volts to the base of transistor $T_{40}$, rendering it conductive. The remaining transistors $T_{21}$ through $T_{23}$ at this time will be conductive, dropping the voltage at the base electrodes of transistors $T_{41}$ through $T_{43}$ close to 0, rendering these transistors nonconductive. Simultaneously therewith, the negative going pulse applied on line 352 enables the AND gate 362*a* through 362*d*, which are coupled to the left-handmost flip-flops of the memory. The outputs of these flip-flops are enabled to pass through the transistors $T_{24}$ through $T_{27}$, and finally to render transistor $T_{39}$ conductive, which, in turn, is coupled to the "9" cathode of all four display tubes 391 through 394. However, since only the anode of tube 391 is connected to +250 volts, this is the only display tube which will illuminate at that given instant and which, in turn, will illuminate the decimal number "9." The next pulse from the scanner-recorder will appear on line 353 which is applied through sense line 356 to the next set of AND gates associated with flip-flops 161*a* through 161*d*, causing these flip-flops to pass their states through the display converting circuitry 365 so as to enable only one particular cathode of all four display tubes 391 through 394. However, it should be noted that line 353 connects negative potential only to the base of transistor $T_{21}$, rendering it nonconductive so as to couple the anode of only display tube 392 to positive 250 volts, in the same manner as was previously described.

The remaining pulse receiving lines 341 and 346 from the scanner-recorder operate in a like manner to enable the outputs of flip-flops 160*a* through 160*d* and 159*a* through 159*d*, respectively, to be passed through the display converting circuitry 365 so as to illuminate the numbers to be displayed in tubes 393 and 394, respectively. The pulses applied to lines 352, 353, 342 and 346 are continuously cycled at a substantially high rate of speed so that even though each one of the four display tubes are illuminated through only one-fourth of the overall cycle time, or through a 25% cycle time, the pulses are of a sufficient repetition rate so as to cause the persistence of the human eye to consider the display lamps as being continuously lit. The marked advantage obtained from this arrangement is that the display provides sufficient illumination, while, at the same time, the life of the display tubes is increased by more than the square of the cycle. Thus, if the tubes are only ON one-fourth of a duty cycle, their life is extended to more than sixteen times that of a tube which would continuously be illuminated throughout the cycle time.

It should be understood that the synchronizing pulses applied to lines 352, 353, 341 and 346 from the scanner-recorder are continuously present, regardless of the fact that the keyboard is or is not in use. It, therefore, becomes important to prevent any display from being illuminated when the keyboard has no decimal numbers stored in its memory, as well as those times at which certain positions of the memory contain no decimal number. For example, let it be assumed that an operator wishes to record a transaction where $10.00 in chips have been purchased. Thus, only the two right-handmost digit positions of memory will contain decimal numbers, and the two left-handmost digit positions in memory will contain no data. At the time that a pulse is applied to line 352, the left-handmost digit position will be sensed. Since the flip-flops 162*a* through 162*d* will all be in their SET state, the output terminals 380, 381, 392 and 393 should all be at logical 0 or 0 voltage reference level. All of these terminals are connected to the cathodes of diodes 395 through 398 which have their anodes connected in common through a resistor to the base of transistor $T_{45}$. If any one of these cathode terminals is negative, transistor $T_{45}$ will be driven into cut-off. However, if all of these output terminals are at positive or logical 0 level, the transistor $T_{45}$ will be driven into conduction, further causing transistor $T_{44}$ to conduct. This will cause the +250 volt bus 302 to apply its voltage through a relatively low resistance path comprised of resistor R31, transistor $T_{44}$, and transistor $T_{45}$ to ground, or reference potential. This will lower the voltage level at terminal 400 to a level which is insufficient to allow any of the display tubes 391 through 394 to illuminate. Since only tube 391 receives an enabling pulse from line 352, this is the only tube which could be lit at this time. Obviously, the three remaining tubes 392–394 cannot be illuminated, since they do not receive enabling pulses at the base electrodes of their associated transistors $T_{21}$ through $T_{23}$, respectively. Thus, any time that a group of vertically aligned flip-flops 159*a*–159*d* through 162*a*–162*d* representing any decimal position in the SET state, the diodes 395 through 398 and transistor $T_{44}$ and $T_{45}$ operate to prevent the display tube enabled at that given instant of time from providing any illuminating display.

It should be noted that the pulses applied to lines 352, 353, 341 and 346 from the scanner-recorder are always present and continuously repeat themselves, whether or not the keyboard has generated a bid signal so that all keyboards of the system are capable of generating an illuminated display before a bid signal is generated through the depression of a function key.

The scanner also automatically knows which digit position it is receiving with regard to the information being transmitted, since the scanner controls what digit position will be enabled at any given instant of time.

The lines 353, 341 and 346 are also connected to the switch assemblies 306, 310 and 314 in order to transmit back to the scanner-recorder the octal information representing the operator's identifying number. For example, line 353 is coupled through diodes 324–326 to enable switches 307–309, which may be selectively closed, to simultaneously pass their open or closed states to output lines 335–337, respectively, to indicate that the most significant digit position of the operator's identifying number is being transmitted to the scanner location. When line 341 receives an enabling pulse, diodes 338–340 perform the same function for switch assembly 310. In a like manner, when line 346 receives an enabling pulse, diodes 347–349 perform the same function for switch assembly 314. The line 352 may be wired to additional switch members such as, for example, the switch members 318–320 to transmit information indicating the particular table number. Thus, when a keyboard has not generated a transmit request, the display circuitry is nevertheless operative to allow the operator to observe the visual display before depressing a function key. Once a function key is depressed, the enabling pulses, which are sequentially transmitted from the scanner location, will transfer one digit position of the operator's identifying number simultaneously with one digit position of the data, and continue in this manner until the operator's identifying number and the data in the display 360 and the memory means is transmitted. The information relating to plus (+) or minus (−) in chips or cash need not be cycled in a similar fashion, since their outputs all go to separate lines, and further since the state of these four possible function outputs indicating what type of operation has been performed are all stored in bistable flip-flops which retain their state after an acknowledgment signal is received from the scanner, and after the keyboard has been cleared subsequent to the receipt of an acknowledgment signal.

SCANNER-RECORDER

Before consideration of the scanner-recorder electronics, a brief description of the scanner-recorder functions will first be given.

The transactions recorded at each keyboard input station are transferred to the scanner for the purpose of printing out on a typewritten page, as well as preparing a punched paper tape simultaneously therewith, which may be used for subsequent processing. The print-out and tape punching operation are, in one preferred embodiment, performed by a teletypewriter which is a piece of equipment manufactured by the Teletype Corporation, and which performs advantageously with the system of the instant invention. However, it should be understood that any other system for typing and print-out may be employed. For purposes of a preferred embodiment, the teletypewriter unit will be considered as an integral part of the system of the instant invention.

The teletypewriter unit employs a predetermined code format of Mark and Space pulses, all data bits being of equal length. The format is basically a start pulse, eight data pulses, and a stop pulse. The start pulse has a pulse duration equal to any data pulse, whereas the stop pulse has a pulse duration twice the pulse length of any data pulse. The teletypewriter unit functions such that each unit pulse length is approximately 9.09 milliseconds. It, therefore, becomes necessary to provide the system of the instant invention with blocking pulses compatible with the teletypewriter unit so that read-out will be fully synchronized with the scanner-recorder.

Figure 6:
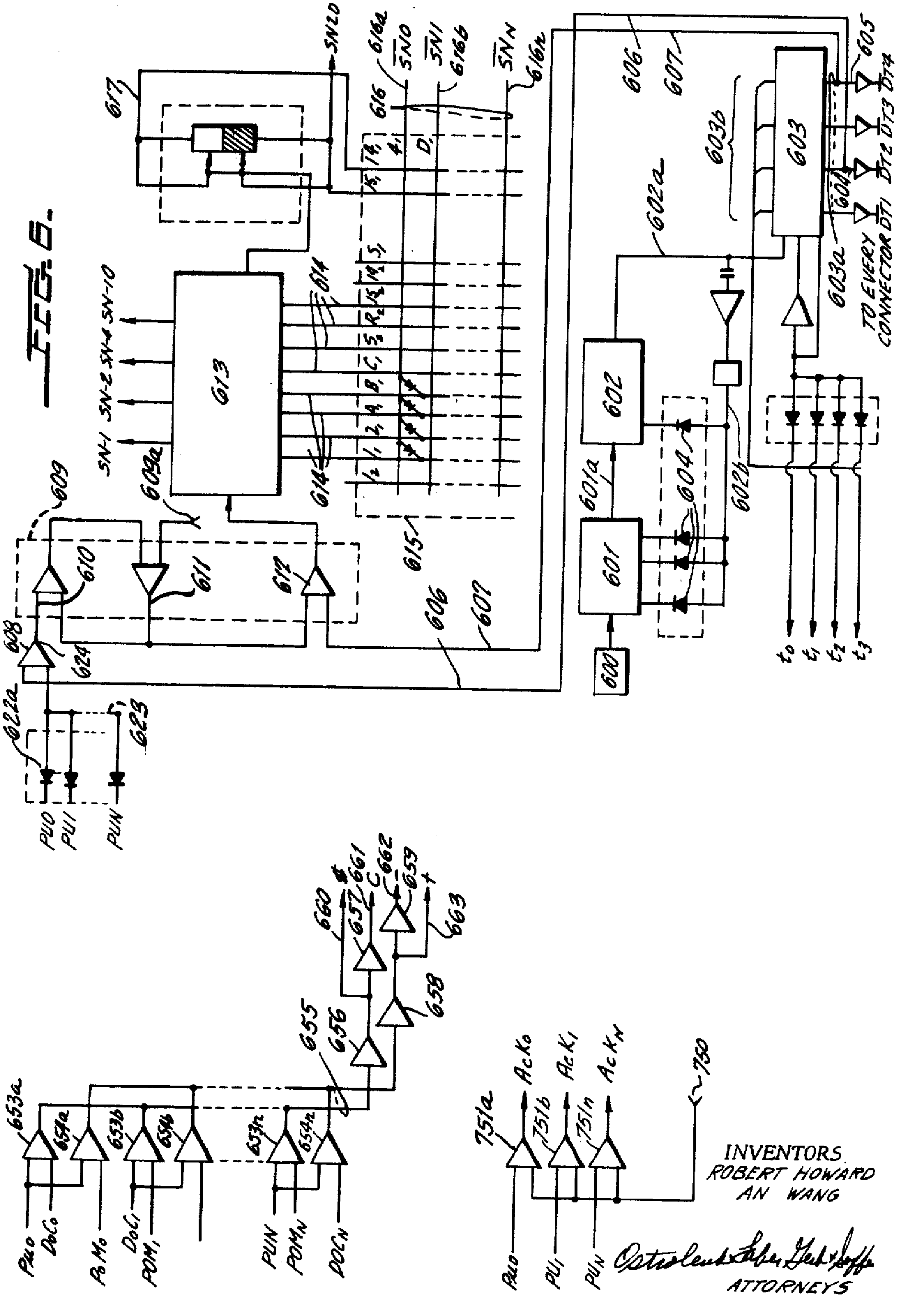

FIG. 6 shows the scanner-recorder pulse generating means which is comprised of an oscillator 600 which may be, for example, a crystal-controlled oscillator having a frequency of 100 kilocycles. Obviously, any other form of oscillator may be employed, as desired. The output of oscillator 600 is applied to the input of a count-of-16 counter 601 capable of storing a maximum of sixteen binary counts (0 through 15) before resetting. The output of count-of-16 counter 601 is applied to a second count-of-16 counter 602 having an output **602*a* which is coupled to the input of a four-bit or four-stage shift register 603, and which is further coupled through a feedback path 602*b* to selected stages of counters 601 and 602 by diodes 604**.

As was previously mentioned, the pulse duration of the unit pulse in a teletypewriter is 9.09 milliseconds. It, therefore, becomes necessary to step down the pulse rate of crystal oscillator 600 which operates at 100 kilocycles per second, so that the output terminal **602*a* will generate a pulse substantially of a pulse duration of the teletypewriter. Dividing the output pulses of oscillator 600 by two count-of-16 counters is the equivalent of dividing the output by 16×16, or 256. Dividing this again by four would yield an output pulse of pulse duration 10.24 milliseconds, which is too long. Thus, the feedback path 602*b* which couples diodes with selected stages are connected in such a manner as to provide a count of 227 counter. The operation of the counter is such that each time it reaches a capacity or full count, it automatically resets to a count of 29 and begins counting from 29 each time, causing it to operate as a count-of-227-counter. Multiply-the number 2.27 by 4, we achieve a pulse duration of 9.08 milliseconds, which is well within the tolerance of operation for a teletypewriter unit. The actual function of the system is such that if it is desired to generate the four timing pulses within each pulse duration, this is provided for by coupling the output of the count-of-227-counter to the input of a four-stage shift register 603 which operates to receive the output pulse from the output terminal 602*a*** and cause it to appear shifted by one stage each time at the outputs $D\overline{T}_1$, $D\overline{T}_2$, $D\overline{T}_3$ and $D\overline{T}_4$ in order to generate four timing pulses per pulse duration of the teletypewriter unit pulse.

The four-stage shift register 603 has a first group of output terminals **603*a* and a second group of output terminals 603*b*, the outputs of terminals 603*a* being inverted from the outputs of terminals 603*b*. The outputs of terminals 603*b*** may be used for further nonsynchronization purposes, as will be more fully described. The output terminals $D\overline{T}_1$–$D\overline{T}_4$, respectively, are coupled in common to the four associated pulse lines of each keyboard station in order to operate the display during periods before a transmit operation is being performed and in order to synchronize the transfer of data from a transmitting keyboard to the scanner-recorder.

The output terminal 604 of output terminal group **603*a* is coupled through conductor 606 with one input of an AND gate 608 which when enabled in a manner to be more fully described, triggers a bistable flip-flop 609 at its input terminal 610 to cause its output terminal 611 to go to logic 0 level so as to inhibit AND gate 612 from passing a pulse derived from output line 605 of output line group 603*a*, which is coupled to AND gate 612 through conductor 607. If bistable flip-flop 609 is SET, so that its output terminal 611 is logical 1, AND gate 612 will be enabled, causing pulses to pass from line 605 through conductor 607 and the AND gate 612 into a four-stage or count-of-16-counter 613 which has selected ones of its output terminals coupled to the column conductors 614 of a code conversion matrix 615**, which may, for example, be a matrix of the type employed in the keyboard station as depicted in FIGS. 4*a*–4*d*, wherein the column conductors 614 are selectively coupled to row conductors 616 for the purpose of converting the count of count-of-16-counter 613 into a combination so that only one of the end output lines 616 of the code conversion matrix will be in an enabled state at any given instant. In the preferred embodiment, which is preferably within the design for a system in which a capacity of 32 keyboard stations are employed, additional counting capacity must be provided.

Figure 5:
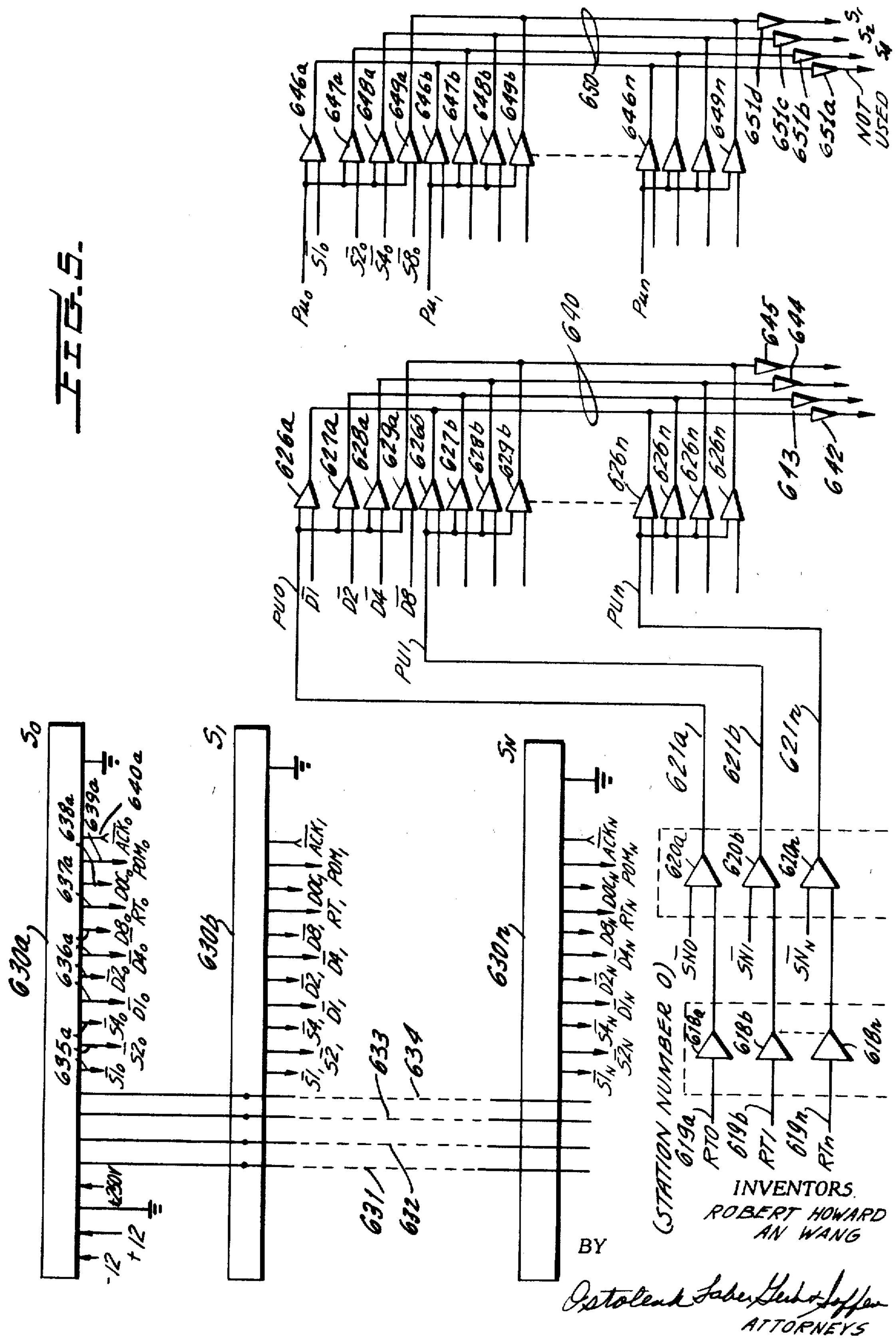

Since a maximum of 32 keyboard stations are employed an additional stage 617 has been added to the count-of-16-counters 613 to permit any one of 32 possible combinations to be formed thereby to enable as many as 32 output lines 616 to be provided. Each of the output lines **616*a*–616*n* is employed for the purpose of scanning a particular keyboard station, as can best be seen from a consideration of FIG. 5. As is shown in FIG. 5, a plurality of inverter circuits 618*a*–618*n* is provided, each having input terminals 619*a*–619*n* for receiving a request transmission signal from each of the N keyboard stations. The signal is inverted by its associated inverter 618*a*–618*n* and applied to one input terminal of an associated AND gate provided in AND gate group 620*a*–620*n*, respectively. The other input terminal of each of the N AND gates 620 receives a pulse from each of the N output terminals 616*a*–616*n*, shown in FIG. 6. For example, none, one, all or any number between one and all of the keyboard input stations may be simultaneously operated by their associated operators who ultimately press a function key to generate a request transmit signal. However, the scanner which continuously cycles through terminals 616*a*–616*n* will stop only upon reaching the next keyboard station having a transmit request signal which simultaneously appears with the scan signal of the scanner. For example, if keyboard station 1 generates a transmit request signal and the scanner has already passed the one position and has gone to the two position, then the keyboard station 1 must wait until the scanner completes its scanning cycle and returns to the one position before data at the keyboard station one position will be picked up. Since the cycling rate for 32 stations is only a few seconds, no station need wait very long before its transmit request signal will be honored. Let it be assumed that keyboard station 1 desires to transmit. An appropriate signal will be applied to terminal 619***a* of FIG. 5 causing it to be inverted through inverter 618*a* and applied to one terminal of AND gate 620*a*. When the scanner generates a signal at its output terminal 616*a* AND gate 620*a* will be enabled causing a pickup signal to be generated at its output terminal 621*a*. The pickup signals are each applied to a pickup line having the diodes 622*a*–622*n* (FIG. 6) the diodes being equal in number to the number of keyboard stations in the system. The anodes of all diodes 622*a*–622*n* are connected in common to a bus 623 coupled to the input of an AND gate 624 causing bistable flip-flop 609 to reset so that its output terminal 611 goes to binary ZERO inhibiting the pulses from line 605 from passing through gate 612. The-count-of-32-counter, which is a composite of count-of-16-counter 613 and stage 617 will remain locked in at the keyboard station generating a pickup signal and will return to its count in a manner to be more fully described upon resetting of the bistable flip-flop 609.

Returning to FIG. 5, the pickup signal at station 1 is applied simultaneously to one input of a group of four AND gates 626*a*–629*a*. In a like manner, pickup signal 2 is simultaneously applied to a second group of AND gates 626*b*–629*b* and so forth until the last pickup signal from the Nth scanning position is applied simultaneously to the group of AND gates 626*n*–629*n*. Assuming the key board station 1 has generated a pickup signal, all four AND gates 626*a*–629*a* are enabled. As was previously described, the scanner generates four timing pulses $\overline{\text{DT}}$1–$\overline{\text{DT}}$4, respectively, which also as was previously described are the pulses used to cycle the display of each keyboard station and simultaneously therewith employed for the purpose of synchronizing read-out of data from a keyboard. The pickup signal 1, which enables AND gate 626*a*–629*a* allows each of these gates to pass the state of the particular digit position being scanned.

As shown from the left-hand side of FIG. 5, the blocks 630*a*–630*n* represent each of the keyboard stations. The scanner output terminals $\overline{\text{DT}}$1–$\overline{\text{DT}}$4 generated by the circuitry shown in FIG. 6 is coupled to common buses 631–634 so as to simultaneously provide the four timing pulses for display purposes and for readout purposes at each of the stations. The four left-handmost input terminals for each station provide the bias voltages necessary for operation of each keyboard such as the minus 12, plus 12, ground and plus 250-volt bias levels. Upon the occurrence of the DT1 pulse the station generating a transmit-request signal such as, for example, the first station 630*a* simultaneously provides three input terminals 635*a*, the three octal bits of the first operator's identification number. The next four terminals 636*a* have simultaneously present at their outputs the four binary bits representing the most significant digit position of the information and memory. Output terminal 637*a* is received from each station and is coupled to the scanner-recorder to indicate the presence of a transmit-request signal. Output terminals 638*a* and 639*a* provide logic level signals to indicate whether a dollar or chip transaction and a plus or minus transaction has been generated by the keyboard transmitting. Input terminal 640*a* is derived from the scanner recorder and is transmitted to the station being recorded as an acknowledge signal in a manner to be more fully described. Each of the transmit request signals derived from line 637*a* is applied to one of the associated input terminals 619*a*–619*n*, respectively.

Upon the occurrence of pulse $\overline{\text{DT}}$1 the first information digit appears at output terminals 636*a*. These are coupled to one associated input of the AND gates 626*a*–629*a* which are coupled through the common output line 641. Upon the occurrence of the $\overline{\text{DT}}$2 pulse the keyboard station 630*a* coupled to the scanner, simultaneously applies the four binary position of the next most significant digit to the four respective AND gates 626*a*–629*a*. The pickup signal applied in common to the other input terminals of AND gates 626*a*–629*a* persist through the entire period in which the four $\overline{\text{DT}}$ pulses are generated allowing the binary states of the next most significant digit to pass through the output terminals of the AND gates and into the common terminal 641 where they are amplified and inverted by inverters 632–645 respectively.

As each station is scanned to determine whether it has generated a request transmission pulse the other AND gate groups 626*b*–629*b* through 626*n*–629*n* will be enabled by a pickup signal in a like manner as was previously described. The outputs of these AND gate groups are ORed, i.e., connected in common to output line 641 so as to pass through the inverter circuits 642–645 in a like manner for coupling to the teletypewriter in a manner to be more fully described.

Considering again the blocks 630*a*–630*n* of FIG. 5 which represent each keyboard station in block diagram form, it will be noted that the timing pulses $\overline{\text{DT}}$1–$\overline{\text{DT}}$4 simultaneously cause the octal code digits to be transmitted through the receiving terminal groups 635*a*. These terminals of each station are coupled through the AND gate groups 646*a*–649*a* through 646*n*–649*n* with the group of the above mentioned AND gates being provided for each of the octal code digits transmitted for each station. Considering station 630*a* as that doing the transmitting, the pick-up pulse is applied to one input terminal of all the AND gates 646*a*–649*a* with this signal lasting through a time duration sufficient to receive each of the octal code digits. As the first pulse DT2 is transmitted the output terminal of group 630*a* generating the first octal digit position will be applied to one input terminal of AND gate 646*a*. In a like manner the remaining digit positions will transmit the second and third binary octal bits upon the occurrence of pulses DT3 and $\overline{\text{DT}}$4 respectively. The $\pm 0$ input going to AND gate 649*a* is provided if necessary, but in the present embodiment is not employed for any purpose insofar as operation of the teletypewriter unit is concerned. However, this fourth AND gate position 649*a* may be employed for a fourth digit position to permit decimal coding of the operator's number, if necessary, or to provide any other function such as an indication of the table number, if desired, which may be 2 or 3 digit positions so as to form a quaternary or octal code, for example, for the purpose of identifying a table number.

Each of the AND gate groups are connected in common to the bus group 650 and are applied to inverter amplifiers 651*a*–651*d*, respectively, for coupling into the teletypewriter unit in a manner to be more fully described.

Turning now to FIG. 6 and the manner in which the plus or minus (POM) and dollar or chips (DOC) data is picked up at each keyboard station, there is shown therein a group of AND gates 653*a*–654*a* through 653*n*–654*n*, each group being provided for one of the N keyboard stations. As is shown in FIG. 5, considering station 1, for example, designated by numeral 630*a* the dollars or chips line 638 and the plus or minus line 639*a* are coupled to respective inputs of AND gates 653*a* and 654*a*, respectively. The other input of these AND gates is derived from the pickup signal for station 1 which enables these AND gates to pass the dollar or chip signal and the plus or minus signal to the common buses 655. Each AND gate group 653*a*–654*a* through 653*n*–654*n* is connected in common to these buses and are applied to inverter circuits 656–657 and 658–659, respectively, which cause the dollars, chips, plus and minus signals to be present at the output terminals 660–663, respectively, for application to the teletypewriter in a maner to be more fully described.

Figure 7:
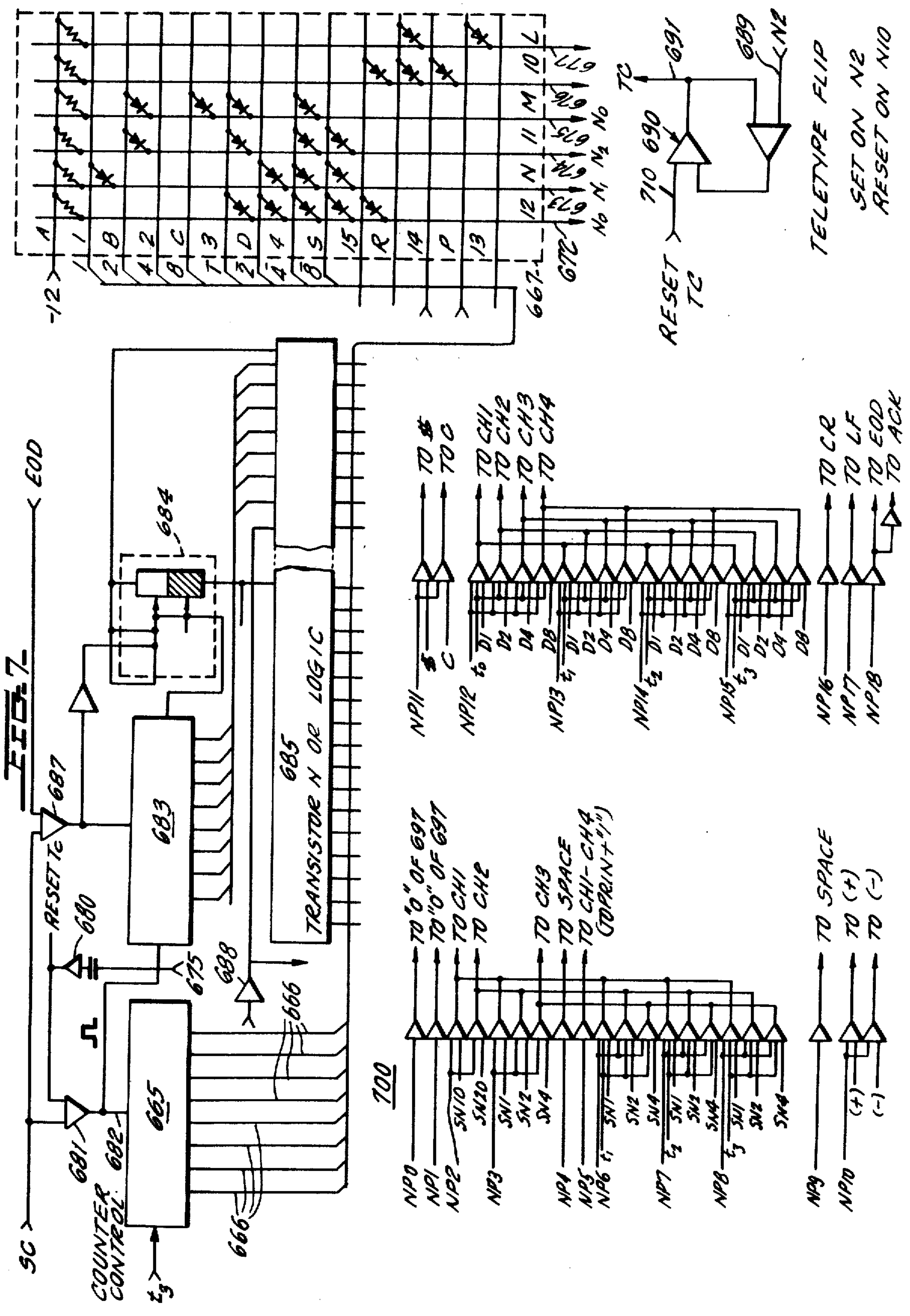

Turning now to FIG. 7, the scanner recorder is further comprised of a count-of-11-counter 665 which has its output terminals 666 coupled as inputs to a diode converter matrix 667 so as to sequentially generate a total of eleven counts. The output terminal 675 of diode matrix 667 generates a pulse at the eleventh count which is applied to the input of amplifier 680 for the purpose of enabling AND gate 681 which receives a pulse from bistable flip-flop 609 shown in FIG. 6 to indicate data from a keyboard station as being recorded so as to enable AND gate 681 and pass a pulse into the counter control input 682 of counter 665 in order to reset and turn on the counter. The output of AND gate 681 is also applied to one input terminal of a count-of-16-counter 683 which is further coupled to an additional flip-flop stage 684 to form a count-of-32-counter. The output terminals of counter 683 and its additional stage 684 are coupled into logic circuitry 685 for the purpose of converting the count of counter 683–684 into sequentially generated output pulses NP–0 through NP–18 respectively, which output pulses are provided for the purpose of determining which digit position in a line of characters on a teletypewriter is to be printed at any given instant of time.

The operation of counter 665 is for the purpose of sequentially generating the number of pulses required for transferring all of the characters to be printed by the teletypewriter on a single line of type to the teletypewriter and for shifting these pulses into the teletypewriter in a sequential fashion. As each group of data is shifted in and the operation begins again, the counter 683–684 generates in sequential fashion a group of 18 timing pulses necessary for the 18 characters to be printed per line. Whereas a larger or smaller number of characters may be printed as desired, in the preferred embodiment of the instant invention the 18 timing pulses generated by counter 683–684 and its conversion matrix 685 are required for the following purposes;

The first four characters of the line are employed to print the station number. The fifth position is a space; positions 6–9 receive the characters identifying the operator number; position 10 is a space; position 11 prints either a plus or minus sign; position 12 prints either a dollar or chips character; positions 13–16 print the characters indicative of the amount of the transaction. The timing signal in the 17th position generates a carriage return signal to return to the beginning of the line; the timing signal generated at position 18 generates a line feed signal causing the teletypewriter to move its platen (not shown) to advance the paper for printing on the next line; and position 19 generates a timing signal indicative of end of data for indicating to the keyboard station transmitting that the data has been recorded and unlocking that keyboard station by generating an acknowledge signal (to be more fully described) in order to permit that keyboard to perform a subsequent transaction.

After counter 665 has been reset as was previously described, AND gate 681 in addition to turning on counter 665 generates a pulse applied to the input terminal of counter 683–684 for the purpose of advancing the count in the counter by one. The second input terminal is coupled to the output of AND gate 687 which receives a signal from bistable flip-flop 609, shown in FIG. 6, and a signal from the diode matrix 700 which will be more fully described for the purpose of turning counter 683–684 on and resetting it to zero.

Once counter 665 is turned on and reset it receives stepping pulses from the $t_3$ output terminal of output terminal group 603*b* derived from shift register 603 shown in FIG. 6. Each time counter 665 runs to a count of eleven it generates an output pulse N–10 (the 11 pulses being N–0—N–10) which causes counter 665 to reset and causes an additional count to be inserted into counter 683–684. The first count N–0 is employed to reset the two four stage shift registers of FIG. 8 in a manner to be more fully described.

The next $t_3$ pulse received from counter 665 adds a count of one to the counter which is converted by diode matrix 667 to generate a pulse at output terminal 673 which is the $N_1$ pulse. This pulse is applied to amplifier 688 to enable the transistor NOR logic circuitry 685 to convert the count in counters 683–684 at any given instant to develop a pulse at one of its output terminals NP–0—NP–18 in sequential fashion. When the NP–0 pulse is generated, this is applied to the NP–0 input terminal of logical gating circuitry 700 which is connected to the "0" input terminal of matrix 697 of FIG. 8. The matrix 697, through selected coupling diodes, impresses the appropriate code for printing of a "0" into lines 698–699 for loading into shift registers 695–696. The count of 11 counter 665 utilizes counts N–2 to N–9 to step the "0" character into Teletypewriter 702. During the time that the NP–0 pulse is present, counter 665 steps to a count of eleven. At its third count, i.e., the N–2 count, output terminal 674 of diode matrix 667 is applied to the set input terminal 689 of a bistable flip-flop causing its output terminal 691 to go to the logic one level. This is applied to input terminal 669 of diode matrix 667 which, through selected diodes in the matrix, is ANDed with a $t_0$ input pulse applied at input terminal 671 to generate a shift pulse which is applied to the input terminal 693 of an amplifier 694 shown in FIG. 8.

Figure 8:
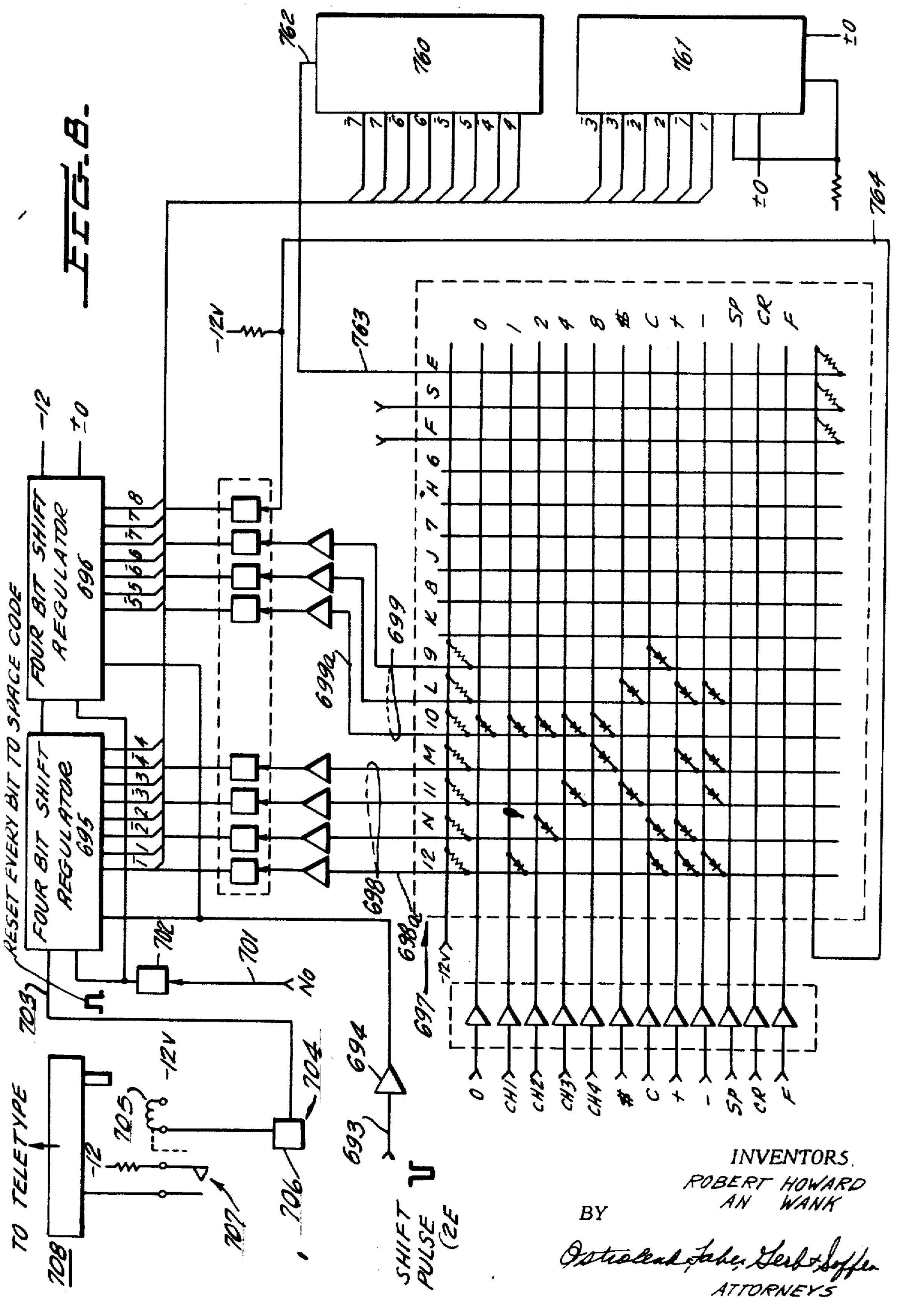

The scanner-recorder circuitry of FIG. 8 is comprised of two four bit shift registers 695–696 coupled in cascade fashion which has a capacity of storing eight binary bit positions which is equal in number to the eight bits of the teletypewriter code.

The NP–0 input terminal of logical gating circuitry 700 is coupled to selected ones of the CH–1—CH–4 input terminals of diode conversion matrix 697, shown in FIG. 8 for the purpose of setting in identification and data characters to shift registers 695–696 through the output lines 698, 699 of the diode matrix. The N–0 output terminal 672 of diode matrix 667, shown in FIG. 7, is applied to the input terminal 701 of an amplifier 702 for the purpose of resetting every bit position in shift registers 695–696 to space code, space code and mark code being the terminology of the typewriter unit.

The N–1 pulse generated at output terminal 673 of diode matrix 667 is used to enable the transistor NOR logic circuitry 685 of FIG. 7. The N–2 pulse generated at output terminal 674 of diode matrix 667 sets the Teletype flip-flop 609 to cause its output terminal 691 to be applied to the input terminal 669 of the diode matrix 667. This signal is ANDed with the T–0 pulse received from four stage shift register 603, shown in FIG. 6, to generate a shift pulse applied to the input terminal 693 of amplifier 694, shown in FIG. 8, for the purpose of shifting the eight mark-space bits inserted into the shift registers 695–696 representing the character to be printed. The shift pulses N–2—N–9 are applied to input terminal 693 and these eight shift pulses are sufficient for shifting the eight bits stored in shift registers 695–696 to cause their output terminal 703 which is coupled to the input terminal 704 of Teletype unit 705. Each binary zero or space bit is insufficient to operate the Teletype solenoid 705. Each binary one or mark bit drives amplifier 706 to energize solenoid 705 and close its contact pair 707 in order to provide the Teletype unit with a current signal indicating the presence of a mark bit.

After the zero character has been printed in the first digit position of the line, counter 665 generates its eleventh pulse N–10 which is applied to the input of amplifier 680 causing counter 665 to be reset through AND gate 681 and causing AND gate 690 to be reset at its input terminal 710 to prevent the Teletypewriter unit from operating. AND gate 681, which resets counter 665 also adds a pulse to counter 683–684 causing it to increase its count by one. The transistor NOR logic circuitry 685 removes the pulse NP–0 and generates the next pulse NP–1. This pulse is applied to the NP–1 terminal of the logical gating circuitry 700 comprised of a plurality of AND gates and which is again directly wired to the zero input terminal of diode matrix 697 causing a mark pulse to appear at the output terminal 699*a* of output terminal group 699 which is shifted into shift register 696. The remaining input lines to the shift registers 695–696 are in binary zero state.

Counter 665 again steps through its eleven counts with count N–2 being employed to set flip-flop 690 to enable shift pulses to be generated at output terminal 677 of diode matrix 667 each time a T–0 pulse is generated by shift register 603, shown in FIG. 6. The shift pulses are then employed to shift the characters stored in shift registers 695–696 into a teletypewriter unit 708. As soon as counter 665 reaches its eleventh count it generates pulse N–10 resetting flip-flop 690 and resetting counter 665 and advancing the count of counter 683 by one. This causes the circuitry 685 to remove the signal from output terminal NP–1 and generate a signal at output terminal NP–2. This signal is applied to the input terminal NP–2 of the AND gate. logic 700 for the purpose of generating the first character of the station number to identify the keyboard station transferring data to the scanner-recorder.

The station number, in the preferred embodiment of the instant invention, is preferably not wired permanently at the keyboard station but is generated by counter 613, shown in FIG. 6. The counter which is coupled to the diode matrix 615, is employed to generate output signals at its output terminals 616*a*–616*n* to indicate which station is transmitting at any given moment back to the scanner. Counter 13 also has five output terminals SN–1, SN–2, SN–4, SN–10 and SN–20 which further indicate the keyboard station being recording, in binary coded fashion. These output terminals are coupled to the input terminals SN–1, SN–2, SN–4, SN–10 and SN–20, respectively of diode AND gate logic 700, shown in FIG. 7. At the NP–2 timing signal, output terminal SN–10 is ANDed with the NP–2 pulse by an AND gate provided in the matrix 700 whose output is coupled to output line CH–1. This output line of matrix 700 is coupled to the CH–1 input line of diode matrix 697, shown in FIG. 8. If this line is at the logic one level at this time, mark bits are impressed upon lines 698A and 699A to be impressed in the associated stages of shift registers 695–696 in order to be subsequently shifted into the Teletypewriter unit.

Also, at the NP–2 time the NP–2 signal is simultaneously ANDed in a second AND gate with the output terminal SN–20 of FIG. 6. The output of the AND gate appearing at the SH–2 output of AND gate logic matrix 700 is applied to the input terminal CH–2 of diode matrix 697, shown in FIG. 8. If the input level to input terminal CH–2 is logic 1, then mark pulses are applied to selected ones of the output lines 698*b* and 699*a* which feed into shift registers 695–696, respectively. The binary states shifted into the shift registers are then shifted out under control of the N–2—N–10 pulses generated by counter 665 and matrix 667 to cause this character to be shifted into the teletypewrier for prining purposes.

Upon the generation of the N–10 pulse, counter 665 resets, advancing counters 683–684 by a count of one, causing the logic circuitry 685 to remove the NP–2 pulse and generate the NP–3 pulse. The NP–3 pulse is applied to the NP–3 input terminal of diode AND gate logic matrix 700 where it combined with three AND gates to enable these AND gates to pass the signals SN–1. SN–2, and SN–4 which appear as output terminals of the counter 613, shown in FIG. 6. These signals are passed through the AND gates coupled with input terminal NP–3 to the CH–1—CH–3 input terminals of diode matrix 697, shown in FIG. 8. The appropriate sense lines 698–699 couple these signals into the shift registers 695–696 and counter 665 steps to a count of eleven again in order to step the data bits from the shift register into the Teletypewriter unit 702. At the end of the eleventh count, which is the N–10 signal, counter 665 is reset and counter 683–684 is stepped by a count of one, causing its logic circuitry 685 to remove the NP–3 pulse and generate the NP–4 pulse. The NP–4 pulse is applied to the NP–4 input terminal of logic circuitry 700 and is directly connected through a one-input gate to the space of SP input terminal of diode matrix 697 of FIG. 8 to step in the Teletypewriter code for a space directly into the Teletypewriter, the wiring of which connects the SP line directly into the Teletypewriter has been omitted for purposes of simplicity.

After the stepping operation is performed the counter 665 steps to another count of eleven, advancing the count of counter 683–684 by one, causing its logic circuitry 685 to remove pulse NP–4 and generate pulse NP–5. This NP–5 pulse is applied to the NP–5 input line of logical circuitry 700 which is directly connected to the selected ones of channel 1 (CH–1) through channel 4 (CH–4) lines to enable the matrix 697 to generate a code in Teletypewriter language to cause the Teletypewriter to print the character "1." Counter 665 again steps to a count of eleven to cause this character to be stepped into the teletypewriter and printed.

The completion of the count eleven resets counter 665 and advances counter 683–684 by one, causing its logical circuitry 685 to remove pulse NP–5 and generate pulse NP–6. This pulse is applied to the NP–6 input line of logical circuitry 700 which is applied to four AND gates together with a $t_1$ pulse provided by the shift register 603 of FIG. 6 to be combined with the $S_1$, $S_2$ and $S_4$ binary bits appearing at the AND gate logic at the output terminals of the amplifier circuits 654–652, respectively, shown in FIG. 5. These bits all occur during the $t_1$ cycling time as was previously described with respect to the keyboard logic shown in FIGS. 4*a*–4*f*. Counter 665 again steps through a count of eleven causing this character shifted into the shift registers 695–696 through the diode matrix 697 to be shifted out of the shift register into the Teletypewriter unit 708. The NP–7 and NP–8 pulse times are generated in a similar fashion and are ANDed with the $t_2$ and $t_3$ pulse times, respectively, as shown in the circuitry 700 to generate the remaining two octal bits of the operator's code number.

After the octal bits are transferred to the Teletypewriter for printing, the NP–9 pulse is generated which is directly connected through logical gating circuitry 700 to the SP input terminal of matrix 697 to cause the Teletypewriter to advance by one space without printing.

The NP–10 pulse is then generated by the logical circuitry 685 of FIG. 7 and is applied to the NP–10 input terminal of logical circuitry 700 which is ANDed in two AND gates with the plus and minus output terminals 662 and 663 of FIG. 6. Depending upon whether a plus or minus transaction has occurred, one of these terminals will be logical one and their outputs are connected to the plus and minus input of diode matrix 697 shown in FIG. 8, to convert the signal present into the teletypewriter code through the conversion matrix 697 and feed it into shift registers 695–696 so as to be stepped out with the stepping of counter 665 into the Teletypewriter unit 702 so as to be printed.

When a count of eleven is again reached by counter 665, counter 683–684 is again advanced so that its logic circuitry 685 removes the NP–10 pulse and generates the NP–11 pulse which is applied to the NP–11 input terminal of logical circuitry 700 which is ANDed with the dollars ($) and chips (C) signals appearing at output terminals 660 and 661 shown in FIG. 6. Only one of these terminals will be logical one, passing these signals to the input terminals dollars ($) and chips (C) lines of the matrix 697 to shift the teletypewriter code converted by the converter matrix 697 into the shift registers 695 and 696 to be printed by the Teletypewriter unit 702.

Counter 665 again goes through a count of eleven, advancing counters 683–684 by a count of one, causing its circuitry 685 to generate pulse NP–12. This pulse is applied to the NP–12 input terminal of logical circuitry 700 where it is ANDed with the $t_0$ pulse generated by one output terminal of shift register 603 shown in FIG. 6, and further ANDed with the D1, D2, D4 and D8 output terminals which are the output terminals of amplifiers 642–645, shown in FIG. 5, indicating that the most significant digit position of the transaction amount is being transmitted to the scanner-recorder from the keyboard station which is on line. The AND gates connected to these input terminals are selectively enabled coupling their output terminals to the input terminals CH–1, CH–2, CH–3 and CH–4, respectively, of the diode converter matrix 697 shown in FIG. 8, so as to shift their states into shift registers 695 and 696. The count of eleven counter 665 again steps to a count of eleven, shifting these bits in serial fashion out of the shift registers and into the Teletypewriter unit 702 for the purpose of printing the most significant decimal digit position of the transaction amount. The NP–13, NP–14 and NP–15 pulses are generated in a similar fashion to read out the next three decimal digit positions of the transactional amount which again are transferred to the channel 1 (CH–1), channel 2 (CH–2), channel 3 (CH–3) and channel 4 (CH–4) input terminals of diode conversion matrix 697 to be shifted into shift registers 695 and 696 and ultimately printed by teletypewriter 702.

After the NP–15 pulse is removed and the NP–16 pulse is applied to the input terminal of logical circuitry 700 and is passed through a one-input gate to the CR input of diode conversion matrix 697 to apply a carriage return signal to the Teletypewriter unit. The actual wiring to the Teletypewriter unit is not shown for purposes of simplicity. The carriage return function causes the type wheel of the Teletypewriter unit to step back to the extreme left-hand end of the unit after the last character has been printed. The NP–16 pulse is then removed and the NP–17 pulse is generated by circuitry 685 as a result of the advancement of counters 683–684 causing the NP–17 pulse to be applied to the NP–17 input terminal of logical circuitry 700 which passes through a one-input gate directly to the line feed (LF) input terminal of the diode conversion matrix 697 so as to be directly wired into the Teletypewriter unit to cause the platen (not shown) of the Teletypewriter unit to advance the paper by one line in order to enable printing of the next line of characters to begin.

After the NP–17 pulse is removed and the NP–18 pulse is generated by circuitry 685 this pulse is applied to the NP–18 input terminal of logical circuitry 700 which is passed by a one-input gate unit to the end of data output terminal (EOD) and to a second gate to the acknowledge (ACK) terminal. The end of data pulse is applied to one input of AND gate 687 which is enabled with the presence of an output pulse from bistable flip-flop 609 shown in FIG. 6, for the purpose of resetting counters 683–684 to a count of zero in order to begin receipt of data from the next keyboard station which has generated a transmit-request signal.

The end of data pulse is also applied to the reset input terminal 609*a* of bistable flip-flop 609, shown in FIG. 6, for the purpose of resetting this flip-flop to generate a logic one level at its output terminal 611 which enables AND gate 612 to pass the next pulse appearing at output terminal 604 of shift register 603 into counter 613 to advance the count by one in order to scan the next keyboard station to determine whether it has generated a transmit-request signal. The scanner of counter 613 will continue stepping until it reaches the keyboard station which has generated a transmit-request signal and will be stopped at that point to permit the transfer of data in the same manner as was previously described.

The acknowledge signal generated at the To ACK output terminal of the logical circuitry 700 is coupled to an input bus 750, shown in FIG. 6, which, in turn, is connected in common to a plurality of AND gates 751*a*–751*n* whose other input terminals are each coupled to the output terminals 621*a*–621*n*, shown in FIG. 5 which generate the pickup signals for each keyboard station as it is on line with the scanner-recorder. A particular acknowledge signal generated is coupled to the appropriate on line stations 630*a*–630*n* through its input lines 640*a*–640*n*, respectively, to be impressed upon the acknowledge input line 237 of the keyboard circuitry shown in FIGS. 4*a*–4*d* which, in turn, is applied to the input terminal of bistable flip-flop 231 resetting the flip-flop causing its output terminal 181 to go to logic zero in order to turn transistor T–18 off so as to enable capacitor C–1 to charge to its eleven volt level in readiness for subsequent transaction operations at that keyboard.

The scanner will then continue with its scan until it reaches the next keyboard station requesting transmission, at which time it will stop, transfer the data to the scanner and print out through the Teletypewriter unit in the same manner as was previously described.

It can be seen from the foregoing that the instant invention provides a novel system for data transfer between a plurality of input stations and a central scanner-recorder unit wherein absolute synchronization is obtained between the central location and each input station through the use of a master clock at the central location. The master clock continuously transmits cycling pulses to enable the display unit of each keyboard station regardless of whether a function key at the station has been depressed so as to enable each operator to observe the illuminated display before depressing a function key. The input stations are continuously scanned until one is reached which desires to transmit information at which time the scanner automatically stops and transfers data to a teletypewriter unit. Simultaneously, with the printing operation the teletypewriter unit is provided with a paper tape punching station which punches out in coded fashion all the data typed out by the Teletypewriter. This enables the punch paper tape record to be periodically removed and transferred to a computer unit for computation of all data in the manner previously described. Obviously, if desired, a punch paper tape reader may be provided to automatically transfer data to the computer when an on line system is employed as shown in FIGS. 2*a* and 2*b*, to permit on line computation of all received data.

If desired, parity generating circuits 760 and 761, as shown in FIG. 8, may be coupled to the output line group 698 and 699 of the diode conversion matrix 697 to form a parity bit which appears at the output terminal 762 to be applied to input line 763 of the diode conversion matrix 697 which, in turn, applies to its output line 764 coupled to input line 763 by a diode, the parity digit in the right-hand most digit position of shift register 696 to generate an error signal when the rule of parity is not met and to generate no signal when the parity check proves correct. The parity check circuitry is well known in the art and will not be described herein in detail for purposes of simplicity. The parity check unit is transmitted to the right-hand most position of shift register 696 of FIG. 8 when the $t_3$ output pulse from shift register 603 of FIG. 6 is present and when the N–1 output pulse of counter 665 is present simultaneously therewith so as to control the generation of the parity check operation at the appropriate time.

Although there has been described a preferred embodiment of this novel invention, many variations and modifications will now be apparent to those skilled in art. Therefore, this invention is to be limited, not by the specific disclosure herein, but only by the appending claims.

What is claimed is:

1. In a business transaction system having a central processing location and a plurality of remote locations, the improvement comprising a keyboard at each remote location having a plurality of manually operable decimal input keys for recording a transaction;

first visual display means;

first memory means for storing information representing a plurality of decimal digits each digit being stored in binary coded decimal fashion;

first conversion means coupled between said input keys and said memory for converting the decimal input key depressed into binary coded decimal form for loading into said memory means;

second conversion means coupled between said memory and said visual display means for converting the binary coded decimal data into decimal signals for said display means;

a plurality of manually operable function input keys for recording the type of the transaction;

bistable storage means coupled to said function keys for storing the type of transaction;

second visual display means;

third means coupled between said bistable storage means and said second visual display means for enabling said second visual means to display those functions related to the function keys depressed;

a power source at said central location;

means for receiving an encoded operator's card;

first normally open switch means coupled to said power source and said keyboard being engaged by an operator's card, said switch means being closed upon insertion of the operator's card to energize said keyboard.

2. The system as set forth in claim 1 further including fourth means at said central location for sequentially pulsing said memory means, said bistable storage means and said first visual display means to sequentially illuminate the digit position and the memory position related thereto so as to illuminate only one digit position of said first display means at any given instant.

3. The system of claim 2 wherein said bistable storage means includes a bistable circuit for each function key which is set by operating its associated function key;

means at said central location for sequentially scanning each of said one bistable circuits of each keyboard to determine its state;

fourth means for interrupting said scanning means when at least one of said bistable circuits being sensed is in its set state;

fifth means coupled to said fourth means for recording all data of the keyboard having its one bistable circuit in the set state.

4. The system of claim 3 wherein sixth means is provided at said central location, said sixth means being coupled between said fourth means and said scanning means for causing said scanning means to resume its scanning operation when said fifth means has recorded all data received from the keyboard transmitting.

5. The system of claim 3 further comprising means at each keyboard for generating a transient signal coupled to said function keys and said decimal keys;

switch means coupled to said bistable circuits for deenergizing said transient signal generating means when said one bistable circuit is in its set state to prevent operation of the keyboard as it awaits a recording operation.

6. The system of claim 5 further comprising means at said central location for driving the bistable circuits of the keyboard transmitting to its reset state to cause said switch means to allow said transient signal generating means to be enabled.

7. The system of claim 1 further comprising means at each keyboard coupled to said decimal and function keys for generating a transient signal upon closure of any of said keys;

said first conversion means coupling said transient signals to selected inputs of said memory means;

pulse shaping means coupled to said first conversion means and the input terminals of said memory means for generating a shift pulse having a leading edge which occurs a predetermined time after closure of a decimal key to prevent any faulty operation which may result due to contact bounce of the depressed decimal key;

said shift pulse being applied to said memory means for loading a binary coded character into said memory means and for shifting already loaded binary coded characters to the next memory position.

8. The system of claim 1 further comprising means at each keyboard coupled to said decimal and function keys for generating a transient signal upon closure of any of said keys;

pulse shaping means coupled between said transient signal generating means and the input terminals of said bistable storage means for generating a shift pulse having a leading edge which occurs a predetermined time after closure of a function key to prevent any faulty operation which may result due to contact bounce of the depressed function key;

said shift pulse being applied to said bistable storage means for loading information representing the function key which has been operated into said bistable storage means.

9. The system of claim 1 wherein said keyboard further comprises a first elongated narrow opening for receiving currency positioned immediately adjacent its associated keyboard;

normally deenergized conveying means having an input end positioned beneath said first opening for conveying currency inserted therein to be emitted at the output end of said conveying means;

a currency receptacle having an opening positioned to receive currency passing out of the output end of said conveying maens;

said conveying means being energized by said first normally open switch means when an operator's card is inserted into the keyboard.

10. The system of claim 9 further comprising seventh means positioned adjacent said first opening to indicate the passage of currency through said opening;

a light source energized upon closure of said first switch means and upon operation of said seventh means to illuminate the currency fed to said conveying means;

camera means for photographing the currency passing through said conveying means upon operation of said seventh means.

11. The system of claim 10 further comprising counter means advanced by said seventh means for counting the number of times said seventh means is operated.

12. The system of claim 1 wherein a local oscillator is provided at said central location;

means coupled to said oscillator for generating a plurality of recycling timing pulses for synchronizing the readout of data from each keyboard with the recording operation of said central location;

a counter for receiving one of said timing pulses during each cycle to sequentially generate a scanning pulse for each keyboard;

fifth gating means for receiving a transmit request signal from each keyboard being further coupled to said counter for interrupting the stepping of the counter at a keyboard position generating a transmit request signal at the same time that a scanning pulse for that keyboard is being transmitted;

sixth gating means coupled to said fifth gating means of the keyboard requesting transmission and further receiving the recycling timing pulses for receiving each character of data at said keyboard in a predetermined arrangement;

seventh means coupled to said sixth gating means for recording the data received from the keyboard transmitting;

eighth means coupled between said sixth and seventh means for driving said seventh means to print the data being received in a predetermined order.

13. The system of claim 12 wherein said eighth means is further comprised of ninth means for converting the data in binary coded form to a code form compatible with said seventh means.

14. The system of claim 13 wherein said eighth means is further comprised of shift register means for storing the converted data from said ninth means;

second counter means driven by one of said recycling timing pulses for shifting the data stored in said shift register means into said seventh means;

third counter means advanced by one count by said second counter means each time said second counter means is recycled to control the transfer of data transmitted to said seventh means by said sixth means.

15. A transaction recording and processing system comprising a plurality of terminals each disposed at an associated one of a plurality of remote locations continuously coupled to scanning and processing equipment provided at a central location for display operational purposes and selectively coupled to said central scanning and processing equipment for data transfer purposes, each of said terminals comprising first memory means for storing function information;

second memory means for storing decimal information;

keyboard means for entering decimal and function information into said first and second memory means;

first display means capable of being illuminated for displaying functional information stored in said first storage means;

second display means for displaying decimal information stored in said second memory means;

said second memory means having a storage capacity for storing a plurality of decimal positions;

said first display means having a plurality of positions equal in number to the decimal positions of said second memory means and each being coupled to an associated position in said second memory means;

said central location comprising means for generating a predetermined number of pulses during a predetermined cycle time and including means for continuously repeating said predetermined number of pulses during each succeeding cycle time;

the number of pulses in each cycle time being equal to the number of positions in said second memory means and said second display means;

means coupled to said pulse generating means for coupling each of said pulses simultaneously to associated positions of said second display means and said second memory means of all of said terminals to cause the display positions of said second display means to be illuminated in sequential fashion to display the character stored in its associated memory position; the recycling of said pulses causing each display position to be intermittently illuminated at a repetition rate to cause the persistence of the human eye to treat the illuminated display as being constantly illuminated.

16. The system of claim 15 wherein said scanning and processing equipment further comprises scanning means for scanning the second memory means of each remote location to determine whether a function key has been operated;

means coupled to said scanning means and the second memory means of each terminal for interrupting said scanning means to stop at a terminal storing an indication that a function key has been depressed;

recording means energized by said interruping means and coupled to the second memory means of each terminal for transferring the contents at that second memory means of the remote location which has interrupted the scanning means for transferring the data stored therein to the recording means under control of the recycling timing pulses to place the operation of said terminals and said scanning and processing equipment in exact synchronism.

17. The apparatus of claim 1 further comprising an operator's card adapted to be releasably inserted into said card receiving means;

said card having a coded pattern for uniquely identifying the card holder;

second switch means responsive to said coded pattern for establishing electrical circuits representing the encoded pattern.

References Cited

UNITED STATES PATENTS

| | | | |
|---|---|---|---|
| 3,307,156 | 2/1967 | Durr | 340—172.5 |
| 3,328,763 | 6/1967 | Rathbun et al. | 340—172.5 |
| 3,380,031 | 4/1968 | Clayton et al. | 340—172.5 |
| 3,407,387 | 10/1968 | Looschen et al. | 340—172.5 X |
| 3,428,793 | 2/1969 | Scuitto | 340—172.5 X |

PAUL J. HENON, Primary Examiner

P. R. WOODS, Assistant Examiner